United States Patent
Sun et al.

(10) Patent No.: US 7,253,133 B2
(45) Date of Patent: Aug. 7, 2007

(54) CATALYST FOR POLYMERIZATION OR COPOLYMERIZATION OF OLEFINS, PREPARATION AND USE OF THE SAME

(75) Inventors: Xiuli Sun, Shanghai (CN); Weiqiu Hu, Shanghai (CN); Cong Wang, Shanghai (CN); Yong Tang, Shanghai (CN); Yuliang Zhang, Shanghai (CN); Chun-an Xia, Shanghai (CN)

(73) Assignee: Shanghai Institute of Organic Chemistry, Chinese Academy of Sciences, Shanghai (CN)

( * ) Notice: Subject to any disclaimer, the term of this patent is extended or adjusted under 35 U.S.C. 154(b) by 185 days.

(21) Appl. No.: 10/761,827

(22) Filed: Jan. 21, 2004

(65) Prior Publication Data

US 2005/0004331 A1 Jan. 6, 2005

Related U.S. Application Data

(63) Continuation-in-part of application No. PCT/CN02/00425, filed on Jun. 17, 2002.

(30) Foreign Application Priority Data

Jul. 23, 2001 (CN) ............................. 01 1 26323
Feb. 9, 2002 (CN) ............................. 02 1 10844

(51) Int. Cl.
*C08F 4/60* (2006.01)
*C08F 4/602* (2006.01)
*C08F 4/64* (2006.01)
*C08F 10/02* (2006.01)

(52) U.S. Cl. ............... 502/167; 502/162; 502/168; 526/161; 526/172

(58) Field of Classification Search ............ 502/162, 502/167, 168; 526/161, 172
See application file for complete search history.

(56) References Cited

U.S. PATENT DOCUMENTS

| | | | |
|---|---|---|---|
| 3,642,746 A | 2/1972 | Kashiwa et al. | |
| 6,281,303 B1 | 8/2001 | Lavoie et al. | |
| 6,294,495 B1 | 9/2001 | Matsunaga | |
| 6,531,424 B2 * | 3/2003 | Ittel et al. | ............ 502/155 |

FOREIGN PATENT DOCUMENTS

| | | |
|---|---|---|
| CN | 1297456 | 5/2001 |
| JP | 07268029 | 3/1994 |
| WO | WO 94/00500 | 1/1994 |
| WO | WO 95/06071 | 3/1995 |
| WO | WO 96/00243 | 1/1996 |
| WO | WO 96/11960 | 4/1996 |
| WO | WO 96/23010 | 8/1996 |
| WO | WO 96/34021 | 10/1996 |
| WO | WO 98/27124 | 6/1998 |
| WO | WO 98/30612 | 7/1998 |
| WO | WO 98/42664 | 10/1998 |
| WO | WO 98/42665 | 10/1998 |
| WO | WO 99/02472 | 1/1999 |
| WO | WO 99/12981 | 3/1999 |
| WO | WO 99/54364 | 10/1999 |
| WO | WO 00/69922 | 11/2000 |
| WO | WO 01/32723 | 5/2001 |
| WO | WO 03/010207 | 2/2003 |

OTHER PUBLICATIONS

Brintzinger, H.H. et al., Stereospecific Olefin Polymerization with Chiral Metallocene Catalysts, *Angew. Chem. Int. Ed. Engl.* 1995, 34, 1143-1170.
*Organometallics*, 2001, 20, 2428-2430.
Beck, W. et al., *Chem. Rev.*, 1988, 88, 1405-1421.
Strauss, S. H., *Chem. Rev.*, 1993, 93, 927-942.

* cited by examiner

*Primary Examiner*—Caixia Lu
(74) *Attorney, Agent, or Firm*—Manni Li; Perkins Coie LLP

(57) ABSTRACT

Catalysts and catalyst systems useful for the olefin polymerization and copolymerization, and their synthesis procedure and usage are disclosed. These catalyst are a kind of novel complexes formed by transition metal from Group III to Group XI and multidentate ligand having the following formula:

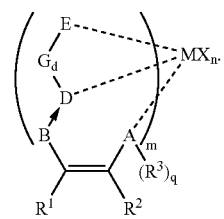

29 Claims, 1 Drawing Sheet

Attached Figure

CATALYST FOR POLYMERIZATION OR COPOLYMERIZATION OF OLEFINS, PREPARATION AND USE OF THE SAME

This is a continuation-in-part of International Application No. PCT/CN02/00425, with an international filing date of Jun. 17, 2002.

FIELD OF THE INVENTION

This invention provides a new class of catalysts (catalyst systems) used for olefin polymerization and copolymerization, their synthesis and utility as homogeneous catalysts (used directly without support) or as heterogeneous catalysts (used after supported on the solids materials such as macromolecular materials, silica, alumina, magnesium chloride etc. or used as catalyst supported on polymer). The catalyst is based on the Group III to Group XI transition metal complexes of multidentate ligands.

BACKGROUND OF THE INVENTION

Since the discovery of the Ziegle-Natta catalyst in 1950s, highly active MgCl$_2$-supported Ti catalysts prove to have excellent properties. (N. Kashiwa etc., U.S. Pat. No. 3,642,746, 1968) and are used for the manufacture of HDPE, LLDPE and i-PP. However, these catalysts are difficult to control the structure and physical properties of the polymer by changing the steric hindrance and electronic effect of the catalyst effectively. The metallocene single-site is found to be excellent for the controllable synthesis of the bulk materials (W. Kaminsky etc., Angew. Chem. Int. Ed. Engl. 1980, 19, 390; H. H. Brintzinger etc. Angew. Chem. Int. Ed. Engl. 1995, 34, 1143; Ishiha, Takeshi, JP 07268029; Exxon Co. Int., WO 9600243, WO 9611960, WO 9400500, WO 9506071). Several single-site non-metallocene catalysts with ligands having N, O, P atom etc. have also been developed since 1995 (M. S. Brookhart etc., WO 9623010, WO 98/30612, WO 99/02472; V. C. Gibson etc., WO 99/12981, WO 98/27124; D. H. McConville etc., WO 2000/069922; R. H. Grubbs etc., WO 98/42664, WO 98/42665; Terunori Fujita etc., WO 99/54364). Selected catalysts are showed as follows:

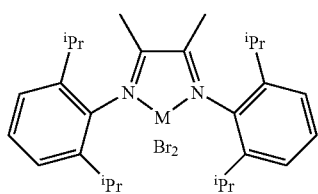

(a): M = Ni
(b): M = Pd

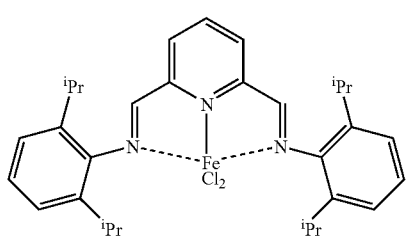

(c)

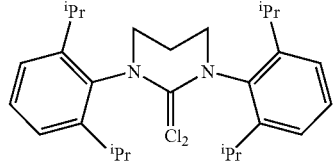

(d)

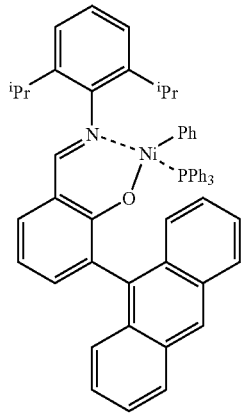

(e)

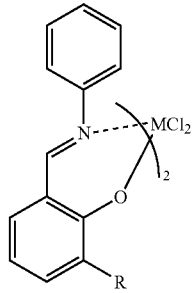

(f)

R = $^t$Bu, Ph
M = Ti, Zr

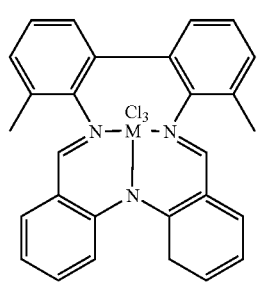

(g)

M = Ti, Zr

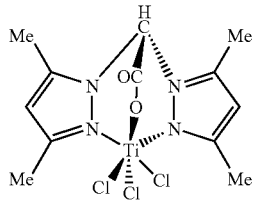

(h)

To date, few reports appeared on the polymerization of olefins by non-metallocene titanium (IV) trichloride and zirconium (IV) trichloride complexes based on the single anion ligands. Nagy S. group reported the synthesis of 8-hydroxyl Quinoline titanium (IV) complex, which showed high activity in ethylene polymerization (Nagy S. etc. WO 9634021). A. Otero group reported the catalyst h was highly active in ethylene polymerization and gave high molecular weight PE and broad molecular weight dispersity (*Organometallics*, 2001, 20, 2428-2430).

SUMMARY OF THE INVENTION

The aim of the invention is to provide a new class of olefin polymerization and copolymerization catalysts (catalyst systems), which are the complexes based on Group III to Group XI transition metals and multidentate ligands.

The aim of the invention is to provide the synthesis of the catalysts, including the synthesis of the ligands and the catalysts by contacting of the ligands with transition metals.

The aim of the invention is to provide the usage of the said catalysts and the catalyst systems, the said catalysts or the catalyst systems can be used as homogeneous (used directly without support) or heterogeneous catalysts (used after supported on the solids materials such as macromolecular materials, silica, alumina, magnesium chloride etc. or used as catalyst supported on polymer) to catalyze the polymerization of ethylene, α-olefin, and monomers containing functional group. The said polymerization means the homopolymerization, oligomerization and copolymerization of the monomers. It also provides the process of preparing the homopolymers, oligomers and copolymers of the said olefin monomers.

The catalysts may be synthesized easily in high yield, they can be used to catalyze the homopolymerization (including oligomerization) and copolymerization of ethylene, α-olefin, olefins containing functional group; The catalyst system showed special characters in catalyzing the polymerization of ethylene: high activity even under the atmosphere pressure with a wide temperature range (−30° C.-150° C.) and Al ratio(Al/Cat=10~3000:1). It also showed high activity in the presence of different co-catalysts. Another outstanding character of the catalyst is that the activity is still higher ($10^5$ g PE/mol Ti. h. atm) when Al/Cat is lowered to 100:1 even to 10:1. The temperature at which the ethylene polymerization is suitable for commercial use; the molecular weigh disperse is narrow and the Mw of the polymer is controllable, the branching can be tuned from 0 to 100/1000 C; the content of the comonomer is adjustable. All of the distinguish characters make the catalysts suitable for commercial use. The structure of the catalyst is showed below:

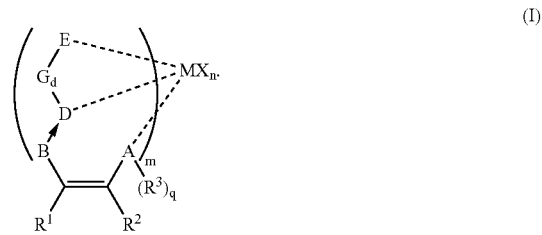

DETAILED DESCRIPTION

Figure 1:
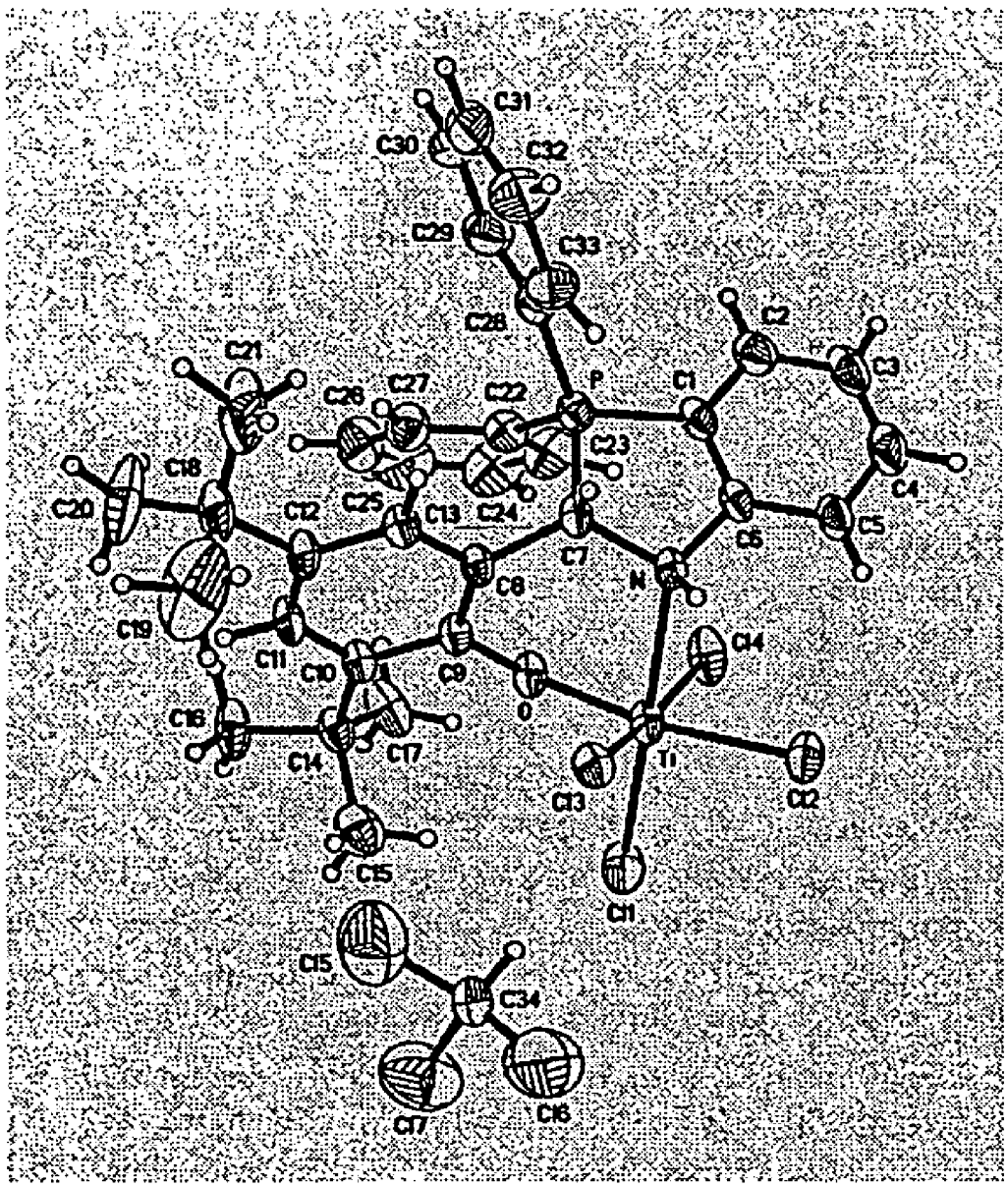
FIG. 1 shows an X-ray diffraction of compound J-1.

The present invention provides a new class of olefin polymerization and copolymerization catalyst (catalyst systems) and its preparation and usage in catalyzing the homopolymerization (including the oligomerization and copolymerization) of ethylene, α-olefin, and olefins containing functional group. It also provides the usage and the condition of polymerization about the catalysts. The catalysts provided in this invention are Group III to Group XI transition metal complexes of multidentate ligands.

The olefin polymerization and copolymerization catalysts provided in this invention are the transition metal complexes showed below (formula I):

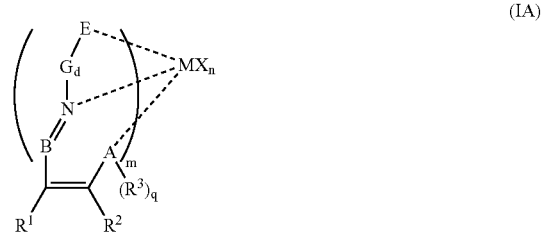

A detailed representation of the catalyst is showed as formula IA and IB:

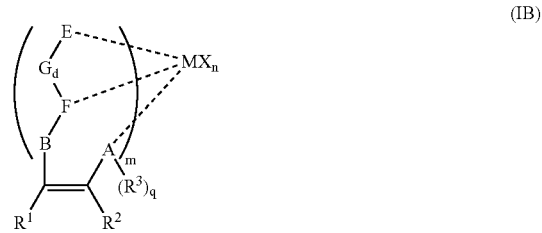

Formula IA is represented by formula IA-1~IA-4 in detail:

IA-1
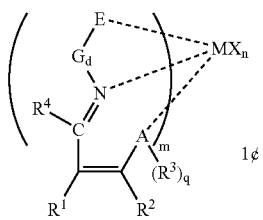

IA-2
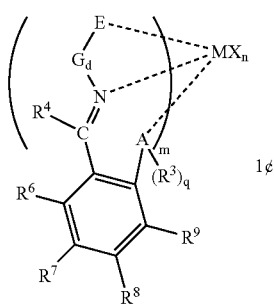

IA-3
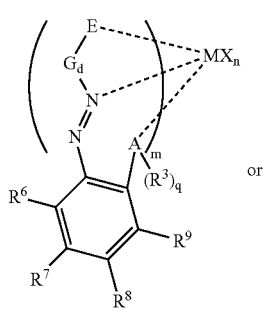

IA-4
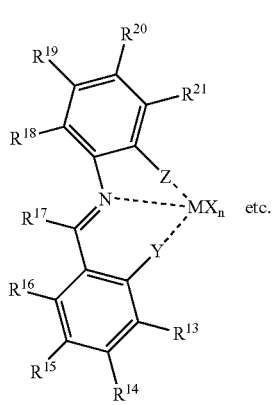

Formula IB is represented by formula IB-1~IB-4 in detail:

IB-1
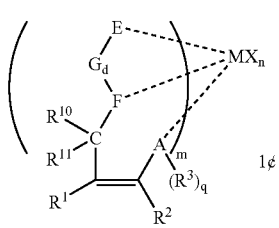

IB-2
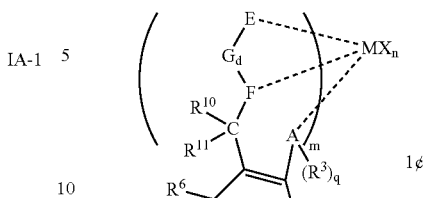

IB-3
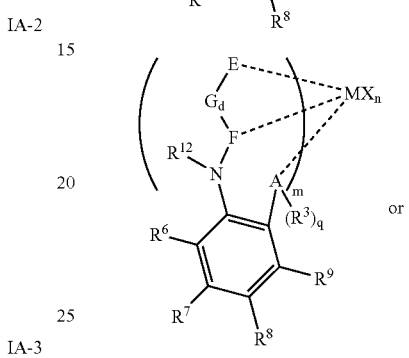

IB-4
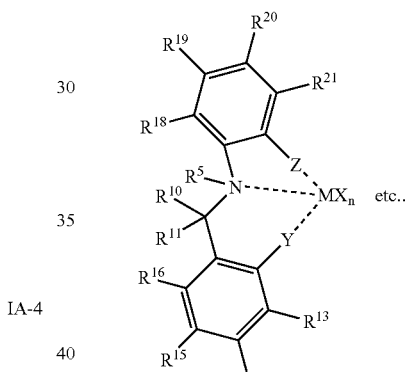

Wherein:
m is 1, 2 or 3;
q is 0 or 1;
d is 0 or 1;
M is Group III to Group XI transition metal, preferably Ti (IV), Zr (IV), Hf (IV), Cr (III), Fe (II, III), Co (II), Ni (II), Pd (II). The metal of Group IV in the highest oxidative station is preferred.
n is 1, 2, 3 or 4;
X represents a group including halogen atom, H, hydrocarbyl of $C_1$-$C_{30}$, substituted hydrocarbyl of $C_1$-$C_{30}$, group containing oxygen atom, group containing nitrogen atom, group containing sulfur atom, group containing boron atom, group containing aluminium atom, group containing phosphorus atom, group containing silicon, group containing germanium atom or group containing selenium atom. Each X in the formula may be same or different, and they may link to one another to form covalent bond or to form a ring;
The said halogen atom include F, Cl, Br, I;
The absolute value of total negative charges of all ligands in the formula is the same as the absolute value of positive charges of M in the formula; the ligands include each X and multidentate ligands.
A is O, S, Se,

—NR$^{23}$R$^{24}$, —N(O)R$^{25}$R$^{26}$,

—PR$^{28}$R$^{29}$, —P(O)R$^{30}$OR$^{31}$, sulfuryl, sulfoxidyl, or —Se(O)R$^{39}$;

B is group containing nitrogen atom, group containing phosphorus atom or hydrocarbyl of C$_1$-C$_{30}$;

D is O, S, Se, group containing nitrogen atom of C$_1$-C$_{30}$, group containing phosphorus atom of C$_1$-C$_{30}$, sulfuryl, sulfoxidyl,

—N(O)R$^{25}$R$^{26}$,

or —P(O)R$^{32}$(OR$^{33}$), in which, O, S, Se, N, P are coordinate atoms, respectively;

E is a group containing nitrogen atom, group containing oxygen atom, group containing sulfur atom, group containing selenium atom, or group containing phosphorus atom, and N, O, S, Se, P are coordinate atoms, respectively;

F is a group containing nitrogen atom, group containing oxygen atom, group containing sulfur atom, group containing selenium atom, or group containing phosphorus atom, and N, O, S, Se, P are coordinate atoms, respectively;

G is an inert group including hydrocarbyl of C$_1$-C$_{30}$, substituted hydrocarbyl of C$_1$-C$_{30}$, or inert functional group;

Y and Z each represent a group containing nitrogen atom, group containing sulfur atom, group containing oxygen atom, group containing phosphorus atom, or group containing selenium atom, such as —NR$^{23}$R$^{24}$, —N(O)R$^{25}$R$^{26}$, —PR$^{28}$R$^{29}$, —P(O)R$^{30}$R$^{31}$, —OR$^{34}$, —SR$^{35}$, —S(O)R$^{36}$, SeR$^{38}$, and —Se(O)R$^{39}$;

— refers to single bond or double bond;

... refers to coordinate bond or covalent bond;

— Refers to covalent bond or ionic bond;

Among them, E binds M by coordination bond, A binds M by covalent bond and D binds M by coordination bond or by covalent bond;

R$^1$, R$^2$, R$^3$, R$^4$, R$^6$, R$^7$, R$^8$, R$^9$, R$^{10}$, R$^{11}$, R$^{12}$, R$^{13}$, R$^{14}$, R$^{15}$, R$^{16}$, R$^{17}$, R$^{18}$, R$^{19}$, R$^{20}$, R$^{21}$, R$^{22}$, R$^{23}$, R$^{24}$, R$^{25}$, R$^{26}$, R$^{27}$, R$^{28}$, R$^{29}$, R$^{30}$, R$^{31}$, R$^{32}$, R$^{33}$, R$^{34}$, R$^{35}$, R$^{36}$, R$^{38}$, R$^{39}$ each represent H, hydrocarbyl of C$_1$-C$_{30}$, halogen, or substituted hydrocarbyl of C$_1$-C$_{30}$ among which the halogen substituted hydrocarbyl are preferred, such as —CH$_2$Cl, —CH$_2$CH$_2$Cl or inert functional group. These groups may be same or different, and the adjacent groups such as R$^1$ with R$^2$, R$^3$; R$^3$ with R$^4$, R$^6$, R$^7$, R$^8$, R$^9$, and R$^{23}$ with R$^{24}$ or R$^{25}$ with R$^{26}$ may form a covalent bond or to form a cycle;

R$^5$ is a lone pair of electrons of nitrogen atom, H, hydrocarbyl of C$_1$-C$_{30}$, substituted hydrocarbyl of C$_1$-C$_{30}$, group containing oxygen atom including hydroxyl, hydrocarbyloxy group —OR$^{34}$, hydrocarbyl containing -T-OR$^{34}$, group containing sulfur atom including —SR$^{35}$, -T-SR$^{35}$, group containing nitrogen atom including —NR$^{23}$R$^{24}$, -T-NR$^{23}$R$^{24}$, or group containing phosphorus atom including —PR$^{28}$R$^{29}$, -T-PR$^{28}$R$^{29}$, -T-P(O)R$^{30}$R$^{31}$. When R$^5$ is a group containing oxygen atom, group containing sulfur atom, group containing nitrogen atom, group containing selenium atom, or group containing phosphorus atom, the N, O, S, P, Se atom in the group may coordinate with M, respectively.

T is a hydrocarbyl of C$_1$-C$_{30}$, substituted hydrocarbyl of C$_1$-C$_{30}$, or an inert functional group.

The catalyst system provided in this invention means the system containing the catalyst. The system comprises six classes including simply 1, or 4, or 1 supported on 2, or contacting 1 and 3, or 1 and 3 supported on 2, or contacting 3 and 4. Reference numbers 1, 2, 3, and 4 are described below:

1: the catalyst showed in formula I;

2: solid support including macromolecular support materials, inorganic oxide support materials such as silica, alumina, and titania, inorganic chloride support materials such as magnesium chloride. It may also be a mixture of the support materials;

3: the co-catalyst W;

4: catalyst supported on the polymer;

Preparation of the Catalyst

In this invention, the catalyst is prepared in organic solvent by mixing the ligand (II) or the anion of the ligand with transition metal complex (III) in mole ration 1:0.1~6 for 0.5~40 hours under the −78° C. to reflux temperature, the reaction time has little effect on the result. The organic solvent may be THF, petroleum ether, toluene, CH$_2$Cl$_2$, CCl$_4$, ethyl ether, dioxane or 1,2-CH$_2$ClCH$_2$Cl etc.

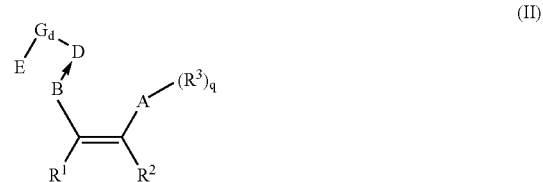

(II)

Wherein:

q is 0 or 1;

d is 0 or 1;

A is O, S, Se,

—NR$^{23}$R$^{24}$, —N(O)R$^{25}$R$^{26}$,

—PR$^{28}$R$^{29}$, —P(O)R$^{30}$R$^{31}$, sulfuryl, sulfoxidyl, or —Se(O)R$^{39}$;

B is group containing nitrogen atom, group containing phosphorus atom or hydrocarbyl of C$_1$-C$_{30}$;

D is O, S, Se, group containing nitrogen atom of C$_1$-C$_{30}$, group containing phosphorus atom of C$_1$-C$_{30}$, sulfuryl, sulfoxidyl,

—N(O)R$^{25}$R$^{26}$,

—P(O)R$^{30}$R$^{31}$,

—P(O)R$^{30}$R$^{31}$, or —P(O)R$^{32}$(OR$^{33}$), among them, O, S, Se, N, P are coordinate atoms, respectively;

E is a group containing nitrogen atom, group containing oxygen atom, group containing sulfur atom, group containing selenium atom, or group containing phosphorus atom, among them, N, O, S, Se, P are coordinate atoms, respectively;

G is an inert group including hydrocarbyl of C1-C30, substituted hydrocarbyl of C$_1$-C$_{30}$, or inert functional group;

→ represent single bond or double bond;

— represent covalent bond or ionic bond;

R$^1$, R$^2$, R$^3$ each represent H, hydrocarbyl of C$_1$-C$_{30}$, halogen, or substituted hydrocarbyl of C$_1$-C$_{30}$ among which the halogen substituted hydrocarbyl are preferred, such as —CH$_2$Cl, —CH$_2$CH$_2$Cl, or inert functional group. These groups may be same or different, and the adjacent groups such as R$^1$ with R$^2$, R$^3$; R$^3$ with R$^4$, R$^6$, R$^7$ R$^8$, R$^9$, and R$^{23}$ with R$^{24}$ or R$^{25}$ with R$^{26}$ may form a covalent bond or to form a cycle;

Ligand (II) may be described by formula IIA and IIB as showed below:

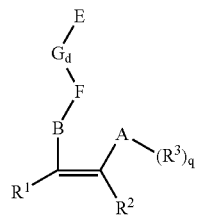
(IIA)

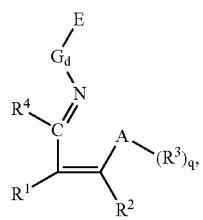
(IIB)

Formula IIA and IIB may be represented by formula (IIA-1~IIA-4) and (IIB-1~IIB4) in detail:

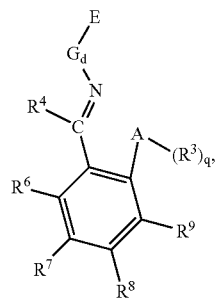
IIA-1

IIA-2

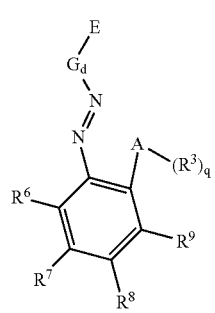
IIA-3 or

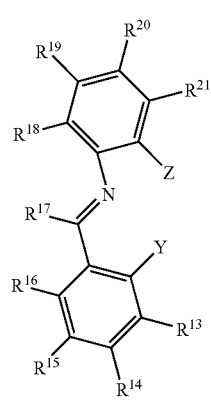
IIA-4 etc.

-continued

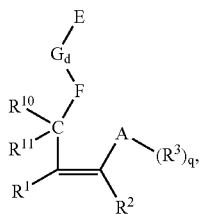

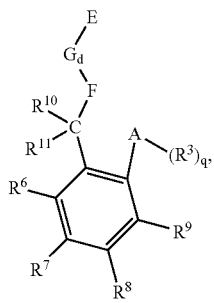

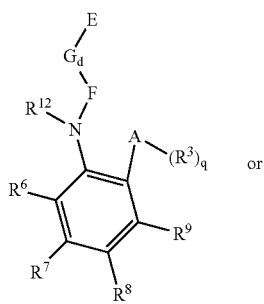 or

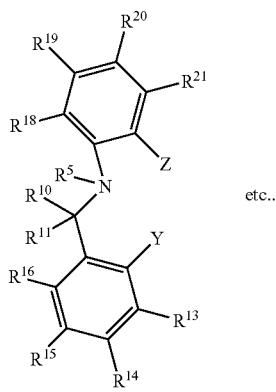 etc..

Wherein:
q is 0 or 1;
d is 0 or 1;
A is O, S, Se,

—NR$^{23}$R$^{24}$, —N(O)R$^{25}$R$^{26}$,

—PR$^{28}$R$^{29}$, —P(O)R$^{30}$R$^{31}$, sulfuryl, sulfoxidyl, or —Se(O)R$^{39}$;

B is group containing nitrogen atom, group containing phosphorus atom or hydrocarbyl of C$_1$-C$_{30}$;

E is a group containing nitrogen atom, group containing oxygen atom, group containing sulfur atom, group containing selenium, or group containing phosphorus atom, among them, N, O, S, Se, P are coordinate atoms, respectively;

F is a group containing nitrogen atom, group containing oxygen atom, group containing sulfur atom, group containing selenium, or group containing phosphorus atom, among them, N, O, S, Se, P are coordinate atoms, respectively;

G is an inert group including hydrocarbyl of C$_1$-C$_{30}$, substituted hydrocarbyl of C$_1$-C$_{30}$, or inert functional group;

Y and Z each represent a group containing nitrogen atom, group containing sulfur atom, group containing oxygen atom, group containing phosphorus atom, or group containing selenium atom, such as —NR$^{23}$R$^{24}$, —N(O)R$^{25}$R$^{26}$, —PR$^{28}$R$^{29}$, —P(O)R$^{30}$R$^{31}$, —OR$^{34}$, —SR$^{35}$, S(O)R$^{36}$, SeR$^{38}$, and —Se(O)R$^{39}$;

→ represent single bond or double bond;

— represent covalent bond or ionic bond;

R$^1$, R$^2$, R$^3$, R$^4$, R$^6$, R$^7$, R$^8$, R$^9$, R$^{10}$, R$^{11}$, R$^{12}$, R$^{13}$, R$^{14}$, R$^{15}$, R$^{16}$, R$^{17}$, R$^{18}$, R$^{19}$, R$^{20}$, R$^{21}$, R$^{22}$, R$^{23}$, R$^{24}$, R$^{25}$, R$^{26}$, R$^{27}$, R$^{28}$, R$^{29}$, R$^{30}$, R$^{31}$, R$^{32}$, R$^{33}$, R$^{34}$, R$^{35}$, R$^{36}$, R$^{38}$, R$^{39}$ each represent H, hydrocarbyl of C$_1$-C$_{30}$, halogen, or substituted hydrocarbyl of C$_1$-C$_{30}$ among which the halogen substituted hydrocarbyl are preferred, such as —CH$_2$Cl, —CH$_2$CH$_2$Cl, or inert functional group. These groups may be same or different, and the adjacent groups such as R$^1$ with R$^2$, R$^3$; R$^3$ with R$^4$, R$^6$, R$^7$, R$^8$, R$^9$, and R$^{23}$ with R$^{24}$ or R$^{25}$ with R$^{26}$ may form a covalent bond or to form a cycle;

R$^5$ is a lone pair electrons of nitrogen atom, H, hydrocarbyl of C$_1$-C$_{30}$, substituted hydrocarbyl of C$_1$-C$_{30}$, group containing oxygen atom including hydroxyl, hydrocarbyloxy —OR$^{34}$, hydrocarbyl containing ethereal bond including -T-OR$^{34}$, group containing sulfur atom including —SR$^{35}$, -T-SR$^{35}$, group containing nitrogen atom including —NR$^{23}$R$^{24}$, -T-NR$^{23}$R$^{24}$, or group containing phosphorus atom including —PR$^{28}$PR$^{29}$, -T-PR$^{28}$PR$^{29}$, and -T-P(O)R$^{30}$R$^{31}$. When R$^5$ is a group containing oxygen atom, group containing sulfur atom, group containing nitrogen atom, group containing selenium atom, or group containing phosphorus atom, the N, O, S, P, Se atom in the group may coordinate with M, respectively.

T is a hydrocarbyl of C$_1$-C$_{30}$, substituted hydrocarbyl of C$_1$-C$_{30}$, or an inert functional group.

The "metal complex" is represented by formula (III):

$$MX_g \qquad (III)$$

Wherein:
g is 1, 2, 3, 4, 5 or 6;
M is a Group III to Group XI transition metal, preferably Ti (IV), Zr (IV), Hf (IV), Cr (III), Fe (II, III), Co (II), Ni (II), or Pd (II). The metal of Group IV in the highest oxidative station is preferred.

X represents a halogen, H, hydrocarbyl of $C_1$-$C_{30}$, substituted hydrocarbyl of $C_1$-$C_{30}$, group containing oxygen atom, group containing nitrogen atom, group containing sulfur atom, group containing boron atom, group containing aluminium atom, group containing phosphorus atom, group containing silicon atom, group containing germanium atom, or group containing selenium atom. Each X in the formula may be same or different, and they may link to one another to form covalent bond or to form a ring;

The halogen may be F, Cl, Br, or I.

The Usage of the Catalyst—Reaction, Polymerization Process and the Polymer Product The catalysts (catalyst systems) provided in this invention may catalyze olefin polymerization as homogeneous catalyst (used directly without support) or heterogeneous catalyst (supported on macromolecular materials, silica, alumina, magnesium chloride, etc., the mixtures of several supports, or used as catalyst supported on the polymer). The polymerization includes oligomerization, homopolymerization, and copolymerization, and the catalysts (catalyst systems) may be used by itself or in the presence of a co-catalyst.

In the polymerization process, the polymerization temperature is preferably from about −100° C. to about 200° C., and the polymerization process provided in this invention at least includes contacting 4 with 1, or contacting 4 with 5, or contacting 4 with 1 supported on 2 in certain order. 3 may also be involved in the process. Reference numbers 1, 2, 3, 4, and 5 are described below:

1: the catalyst showed in formula (I);
2: the solid supports;
3: the co-catalyst W;
4: olefin monomer;
5: the catalyst supported on the polymer.

In general, the catalyst system provided in the present invention may catalyze the polymerization of olefin monomers including ethylene, α-olefin, styrene, all kinds of olefinic acid and their derivatives, olefinic alcohol and their derivatives, dienes, cycloolefins etc. The said α-olefins are the olefins of $C_3$-$C_{16}$ such as propene, 1-butene, 1-pentene, 1-hexene, 1-octene, 4-methyl-1-pentene etc. and the mixtures of them; the said cycloolefins are cyclopentene, cyclohexene, norbornene etc. and their derivatives. The term polymerization refers to the homopolymerization and copolymerization of the said monomers and the said homopolymerization includes the oligomerization.

The polymerization can be run in the liquid process, slurry process, gas process, loop reactor or other polymerization processes.

The polymerization process generally can be conducted in inert solvents such as alkanes, cycloalkanes or aromatic hydrocarbons. The said inert solvents prefer to but not limited to the hydrocarbon of $C_1$-$C_{12}$ such as propane, i-butane, pentane, 2-methylbutane, hexane, toluene, chlorobenzene and/or their mixtures.

The temperature at which the polymerization process may be conducted is from −50° C. to 150° C., preferably 0° C. to 120° C. for higher activity and productivity.

The polymerization process is generally conducted from 0.1 to 10 MPa, preferably 0.1 to 3 MPa for better operating parameter and superior polymer product.

The said co-catalyst W may be MAO, MMAO, EAO, BAO, LiR(R=alkane of $C_1$-$C_{10}$), AlR$_3$(R=alkane of $C_1$-$C_{10}$), Lewis acid, LiR/Lewis acid(R=alkane of $C_1$-$C_{10}$), Broane such as $B(C_6F_5)_3$ etc.

In the polymerization process, the catalyst and co-catalyst may be introduced in any sequence and the mole ratio of the catalyst and the cocatalyst may be changed from 1:1 to 1:5000, preferably 1:10 to 1:2000 for higher activity and yielding polymer with superior morphology and the lower cost.

The polymerization process may be conducted in flask, autoclave, loop reactor or other types of reactors, in addition, the polymerization may be conducted in single reactor, single reactor, reactors in series or in parallel or in reactors with a combination, the reaction condition in each reactor may be the same or may be not.

Terms Used in the Invention are Elucidated Below:

The term "catalyst system" in this invention means the system comprising six classes including simply 1, or 4, or 1 supported on 2, or contacting 1 with 3, or 1 with 3 supported on 2 in certain order, or contacting 3 with 4. Reference numbers 1, 2, 3, and 4 are described below:

1: the catalyst showed in formula I;
2: solid support including macromolecular support materials, inorganic oxide support materials such as silica, alumina, and titania, inorganic chloride support materials such as magnesium chloride. It may also be a mixture of the support materials;
3: the co-catalyst W;
4: catalyst supported on the polymer.

The "co-catalyst W" refers to a neutral Lewis acid, which can remove $X^-$ from M to form $(WX)^-$; when the produced $(WX)^-$ is an anion with weak coordination ability, W can transfer hydrogen to the center metal. For instance, alkyl aluminoxane MAO or MMAO (modified MMAO); Also, one can use two compounds together, of which, one may transfer the alkyl or the hydrogen ion to the metal atom, such as alkyl aluminium compound preferably $AlEt_3$ $AlMe_3$, $Al(i-Bu)_3$ and another one may remove $X^-$ from M such as the sodium salt or silver salt: $Na[B(3,5-(CF_3)_2C_6H_3)_4]$, $AgOSO_2CF_3$, alkyl aluminium compounds or borane $B(C_6F_5)_3$ etc.

The weak-coordinating anions are the anions that are relatively non-coordinated with the metal, the ability of the anions has been discussed in the literature (W. Beck., et al., *Chem. Rev.*, 1988, 88, 1405-1421; S. H. Strauss, *Chem. Rev.*, 1993, 93, 927-942) and the references therein, for the instance, $(R^{41})_3AlX^-$, $(R^{41})_2AlX_2^-$, $(R^{41})AlX_3^-$, $SbF_6^-$, $PF_6^-$, $BF_4^-$, $(C_6F_5)_4B^-$, $(R_fSO_2)_2N^-$, $CF_3SO_3^-$, $((3,5-(CF_3)_2)C_6H_3)_4B^-$;

The hydrocarbon refers to the alkanes of $C_1$-$C_{30}$, cycloalkanes of $C_2$-$C_{30}$ containing alkyne, aromatic hydrocarbons of $C_6$-$C_{30}$, hydrocarbon with fused rings of C8-C30 or heterocyclic compounds of $C_4$-$C_{30}$;

The substituted hydrocarbon is the hydrocarbon having one or more substituted groups which are inert, this means the groups wouldn't interfere with the process by coordinating with the metal atom. If not stated otherwise, it is preferred the halogen substituted groups of $C_1$-$C_{30}$ or the halogen substituted aromatic hydrocarbons of $C_6$-$C_{30}$ including the hydrocarbon with fused rings of $C_8$-$C_{30}$ or heterocyclic of $C_4$-$C_{30}$;

The inert functional groups in this invention are functional groups other than hydrocarbons and substituted hydrocarbons which are inert and don't interfere with the process. The functional groups herein include halogen (F, Cl, Br, I), groups containing oxygen atom, groups containing nitrogen atom, groups containing silica atom, groups containing germanium atom, group containing sulfur atom or group containing stannum atom such as ether ($—OR^{34}$ or $-TOR^{35}$), ester of $C_1$-$C_{10}$, amine of $C_1$-$C_{10}$, alkoxyl of $C_1$-$C_{10}$, nitryl etc. The coordination ability of these inert functional groups with the metal atom is weaker than the groups of A, D, E, F, Y, Z in the formula (I), and coordination group A, D, E, Y, Z with the metal can not be substituted by these inert groups.

The groups containing nitrogen atom are

—NR$^{23}$R$^{24}$, -T-NR$^{23}$R$^{24}$, —N(O)R$^{25}$R$^{26}$;

The groups containing phosphorus atom are

—PR$^{28}$R$^{29}$, —P(O)R$^{30}$R$^{31}$, —P(O)R$^{32}$(OR$^{33}$);

The groups containing oxygen atom are hydroxyl hydrocarboxyl such as —OR$^{34}$, -T-OR$^{34}$;

The groups containing sulfur atom are —SR$^{35}$, -T-SR$^{35}$, —S(O)R$^{36}$, -T-SO$_2$R$^{37}$;

The groups containing selenium atom are —SeR$^{38}$, -T-SeR$^{38}$, -T-Se(O)R$^{39}$;

The groups containing boron atom are BF$_4^{31}$, (C$_6$F$_5$)$_4$B$^-$, (R$^{40}$BAr$_3$)$^-$etc.;

The groups containing aluminium atom are alkyl aluminium compound, AlPh$_4^-$, AlF$_4^-$, AlCl$_4^-$, AlBr$_4^-$, AlI$_4^-$, R$^{41}$AlAr$_3^-$;

The groups containing silicon atom are —SiR$^{42}$R$^{43}$R$^{44}$, -T-SiR$^{45}$;

The groups containing germanium are —GeR$^{46}$R$^{47}$R$^{48}$, -T-GeR$^{49}$;

The groups containing stannum atom are —Sn$^{50}$R$^{51}$R$^{52}$, -T-SnR$^{53}$, -T-Sn(O)R$^{54}$;

T is hydrocarbyl of C$_1$-C$_{30}$ or substituted hydrocarbyl of C$_1$-C$_{30}$ or inert functional group.

Alkyl aluminium compound is the compound that substituents bound to aluminium atom directly and among them at least one group is alkyl. Such as MAO, MMAO (modified MAO), AlEt$_3$, AlMe$_3$, Al(i-Bu)$_3$;

R$^{22}$, R$^{23}$, R$^{24}$, R$^{25}$, R$^{26}$, R$^{27}$, R$^{28}$, R$^{29}$, R$^{30}$, R$^{31}$, R$^{32}$, R$^{33}$, R$^{34}$, R$^{35}$, R$^{36}$, R$^{37}$, R$^{38}$, R$^{39}$, R$^{40}$, R$^{41}$, R$^{42}$, R$^{43}$, R$^{44}$, R$^{45}$, R$^{46}$, R$^{47}$, R$^{48}$, R$^{49}$, R$^{50}$, R$^{51}$, R$^{52}$, R$^{53}$, R$^{54}$ independently represents H, hydrocarbyl of C$_1$-C$_{30}$, halogen atom, substituted hydrocarbyl of C$_1$-C$_{30}$ or inert functional group. These groups may be same or different and the adjacent groups may form a covalent bond or to form a cycle;

FIG. 1 is the X-ray of compound J-1.

In summary, the present invention provides a new class of olefin polymerization and copolymerization catalysts (or catalyst systems), which is a new kind of multidentate complexes based on group 3 to group 11 transition metals. The present invention also provides the synthesis of the ligands and the catalysts and their usage in the olefin polymerization process. The catalysts are synthesized by contacting the ligand with the complex (III) in organic solvent. The catalyst provided in the invention may be used by itself or in the presence of co-catalyst as a homogeneous (used directly without supporting) or as a heterogeneous system (supported on macromolecular materials, inorganic oxide support materials such as silica, alumina, inorganic chloride materials such as magnesium chloride, or the mixtures of the said supports or as catalyst supported on polymer) to catalyze the homopolymerization and copolymerization of olefin monomers such as ethylene, α-olefin, olefins containing functional groups etc.

EXAMPLES

The present invention can be explained in detail by the following examples, but not limited to these.

The following examples showed the different aspects of the invention. The examples provided include the synthesis of ligands, synthesis of metal complexes, polymerization process, polymerization conditions and polymer produced. All manipulations including reaction, preparation and storage were performed under inert atmosphere using standard Schlenk techniques. Molecular weight and molecular weight distribution were determined by Waters model 150 GPC (differential refractive index detector) at 140° C. and 1,2-Dichlorobenzene as eluent, polystyrene as reference sample.

Example 1 to 20 showed the synthesis of some ligands.

Example 21 to 35 showed the synthesis of some catalysts.

Example 36 to 40 showed special catalytic character of system (A-1) in catalyzing the polymerization of ethylene: high activity is obtained even under the atmosphere pressure and wide temperature limit (−30° C.-150° C.) and broad range Al: Cat (Al/Cat=10~3000:1), it also showed high activity in the presence of different co-catalysts. Another outstanding character about the catalyst is the activity higher than 10$^5$ g PE/mol Ti. h. atm can be obtained when Al/cat is lowed to 100:1 even to 10:1. The temperature at which the ethylene polymerization is carried out is suitable for commercial use (40° C.-80° C.); the molecular weight disperse is narrow and the Mw of the polymer is controllable, and the branching can be tuned from 0 to 100 every 1000 C; the content of the comonomer is adjustable. All of these distinguish characters make the catalysts be capable of applying to practice. Not only A-1 system but also the other systems all showed these distinguish characters in the polymerization process.

Example 41 to 54 showed the polymerization results catalyzed by early-transition metal complexes. Example 55 to 58 showed olefin polymerization results catalyzed by late-transition metal complexes.

Example 59 to 72 showed the polymerization results of olefin monomers besides ethylene.

Example 73 showed the polymerization results catalyzed by the alkylated complexes.

Example 74 showed the ethylene polymerization by the heterogeneous catalysts.

Example 1

Synthesis of Ligand L1

To a solution of 3,5-di-tert-butyl salicyaldehyde 8.2 g (34.4 mmol) and (o-aminophenyl) diphenylphosphine 9.6 g (34.6 mmol) in anhydrous ethanol (50 ml) was added zeolite and a few drops of glacial acetic acid in a flask. After refluxing for 24 h, filtered the zeolite, the filtrate was concentrated, cooled to room temperature to give the crude product. Recrystallization from ethanol/ether gave the ligand L1 as pale yellow crystals, 11.8 g (69%).

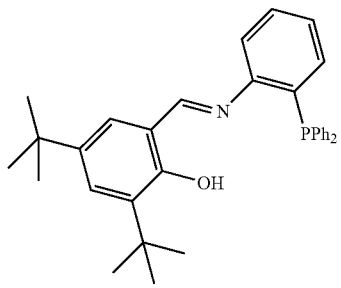

L1

Anal. Found (calcd): C, 80.39 (80.29); H, 7.59 (7.35); N, 2.77 (2.84); $^1$H NMR (300 MHz CDCl$_3$): δ8.4 (s, CH=N), 7.4-6.8 (m, Aryl-H), 1.4 (s, t-Bu-H), 1.3 (s, t-Bu-H); δ($^{31}$P)-13.63 (s).

Example 2

Synthesis of Ligand L2

To a flask was added a solution of 3,5-di-tert-butyl salicyaldehyde 2.34 g (10.0 mmol) and (o-aminophenyl) diphenylamine 2.3 g (8.8 mmol) in anhydrous ethanol of 100 ml. After refluxing 24 h, the resulting mixture was cooled to room temperature to give the product, then washing with cool ethanol for several times and dried to give ligand L2 as yellow crystals, 3.5 g (81%).

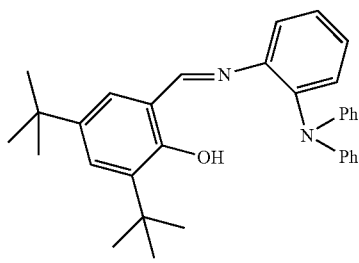

L2

Anal.: Found (Calcd): C, 83.19 (83.15); H, 7.60 (7.61); N, 5.87 (5.88); $^1$H NMR (300 MHz CDCl$_3$): δ13.6 (s, O—H), 8.6 (s, CH=N), 7.5-7.0 (m, Aryl-H), 1.5 (s, t-Bu-H), 1.3 (s, t-Bu-H).

Example 3

Synthesis of Ligand L3

To a solution of 3,5-di-tert-butyl salicyaldehyde 2.34 g (10.0 mmol) and 2,6-di-methyl-phenyl-2-aminophenylether 2.13 g (10.0 mmol) in anhydrous ethanol 50 ml was added to a flask of 250 ml. After refluxing for 20 h, the resulting mixture was cooled to room temperature to give the crude product, washing with anhydrous ethanol for several times and drying to give ligand L3 as yellow crystals 2.9 g (81%).

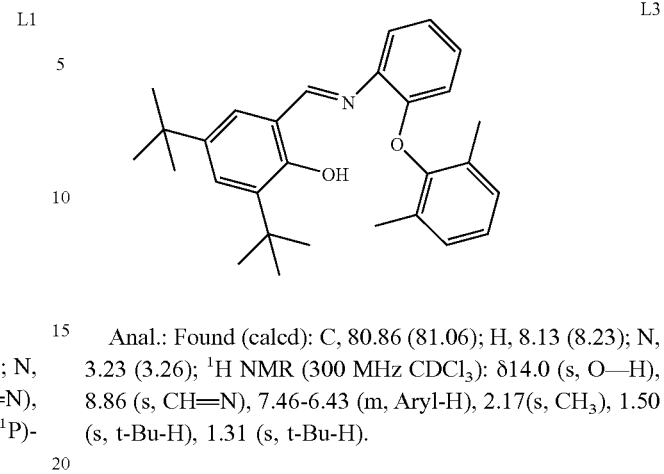

L3

Anal.: Found (calcd): C, 80.86 (81.06); H, 8.13 (8.23); N, 3.23 (3.26); $^1$H NMR (300 MHz CDCl$_3$): δ14.0 (s, O—H), 8.86 (s, CH=N), 7.46-6.43 (m, Aryl-H), 2.17(s, CH$_3$), 1.50 (s, t-Bu-H), 1.31 (s, t-Bu-H).

Example 4

Synthesis of Ligand L4

To a solution of 3,5-di-tert-butyl salicyaldehyde 2.8 g (12.0 mmol) and phenzyl-2-aminophenylsulfide 2.01 g, (10.0 mmol) in 25 ml anhydrous ethanol was added a few drops of glacial acetic acid. Refluxing and stirring for 2 h, the resulting mixture was cooled to to room temperature to give yellow green solid. Recrystallized to give ligand L4, 1.3 g (44.4%).

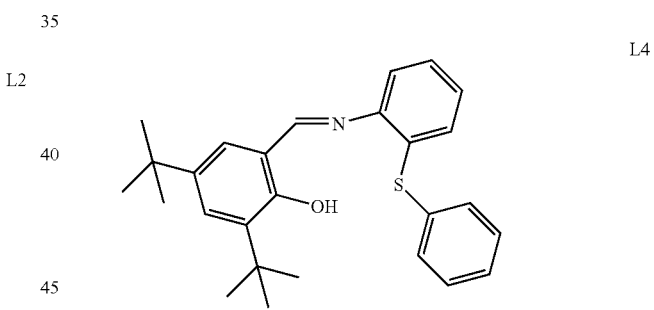

L4

Anal.: Found (Calcd): C, 77.70 (77.65); H, 7.50 (7.48); N, 3.38 (3.35); $^1$H NMR (300 MHz CDCl$_3$): δ13.3 (s, O—H), 8.6 (s, CH=N), 7.45-7.11 (m, Aryl-H), 1.47 (s, t-Bu-H), 1.32 (s, t-Bu-H).

Example 5

Synthesis of Ligand L5

To a solution of 3,5-di-tert-butyl salicyaldehyde 2.8 g (12.0 mmol) and perfluorophenyl-2-aminophenylether 2.75 g (10.0 mmol) in anhydrous ethanol of 25 ml was added a few drops of glacial acetic acid. Refluxing and stirring until the substrate disappeared, the resulting mixture was cooled and filtered to give the crude product. Recrystallized to give product L5, 3.5 g (71%).

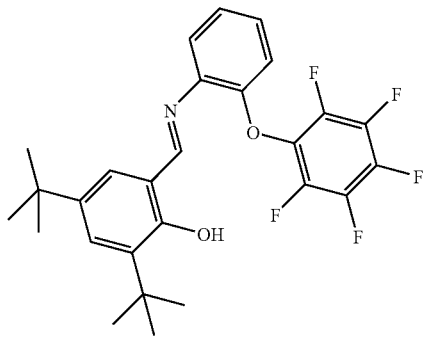

L5

Anal.: Found (Calcd): C, 65.70 (65.98); H, 5.40 (5.33); N, 3.01 (2.85); $^1$H NMR (300 MHz CDCl$_3$): δ13.1 (s, O—H), 8.7 (s, CH=N), 7.4-7.1 (m, Aryl-H), 1.4 (s, t-Bu-H), 1.3 (s, t-Bu-H).

Example 6

Synthesis of Ligand L6

To a solution of 3,5-di-tert-butylsalicyaldehyde 3.4 g (14.0 mmol) and 8-aminoquinoline 2.3 g (16.0 mmol) in anhydrous ethanol of 100 ml was added a few drops of glacial acetic acid. Refluxing and stirring for 24 h, the product was purified by column chromatography to give ligand L6, 2.31 g (64%).

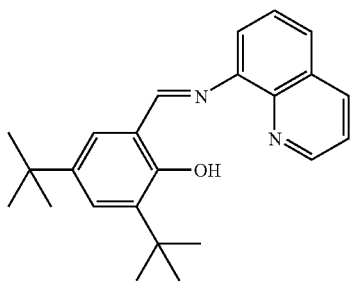

L6

Anal.: Found (Calcd): C, 80.25 (79.96); H, 7.88 (7.83); N, 7.75 (7.77); $^1$H NMR (300 MHz CDCl$_3$): 14.0 (s, O—H), 8.9 (s, CH=N), 9.0 (d, pyridine-2), 8.2 (d, pyridine-4), 7.6 (t, pyridine-3), 7.7-7.4 (m, Aryl-H), 1.5 (s, t-Bu-H), 1.4 (s, t-Bu-H).

Example 7

Synthesis of Ligand L7

To a solution of 3,5-di-tert-butyl salicyaldehyde 2.0 g (8.5 mmol) and 2-aminomethylpyridine 0.92 g (8.5 mmol) in CH$_2$Cl$_2$ of 25 ml was added anhydrous MgSO$_4$ at room temperature, stirring for 20 h and the mixture was filtered. The solvent was removed and the crude product was purified by column chromatography to give ligand L7, 1.21 g (44.4%).

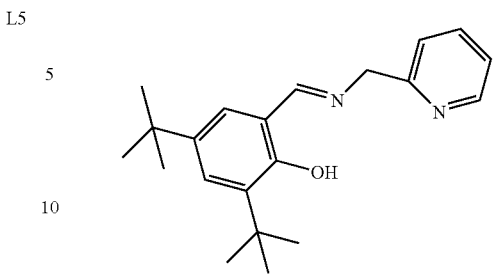

L7

Anal.: Found (Calcd): C, 77.70 (77.57); H, 8.85 (8.98); N, 8.59 (8.60); $^1$H NMR (300 MHz CDCl$_3$): δ13.6 (s, O—H), 8.6 (m, 2H), 7.69-7.14 (m, Aryl-H), 4.93 (s, —CH$_2$—), 1.45 (s, t-Bu-H), 1.32 (s, t-Bu-H).

Example 8

Synthesis of Ligand L8

L8 was prepared by the same procedure as the ligand L1, but the reactant was replaced by 2-hydroxyl 5-nitrobenzaldehyde and O-aminophenyldiphenylphosphine.

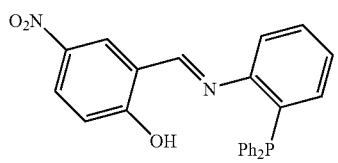

L8

Anal. Found (Calcd) C, 70.77 (70.42); H, 4.50 (4.49); N, 6.45 (6.57); $^1$H NMR (300 MHz CDCl$_3$): δ8.0 (s, CH=N), 7.7-6.6 (m, Aryl-H).

Example 9

Synthesis of Ligand L9

To a solution of ligand L1 0.98 g (2.0 mmol) in methol (10 ml) was added NaBH$_4$ 0.14 g (4.0 mmol) in methol (5 ml) under the nitrogen atmosphere, the mixture was stirred for additional 30 min, then quenched with ice water. The crude product was purified by column chromatography to give the L9, 940 mg (94.8%)

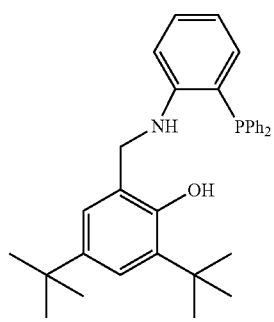

L9

Anal: Found (Calcd): C, 79.87 (79.97); H, 7.89 (7.73); N, 2.81 (2.82); $^1$H NMR (300 MHz CDCl$_3$): 7.74-6.78 (m, 16H), 4.15 (s, 2H), 1.40 (s, t-Bu-H), 1.38 (s, 9H).

The ligands containing imine can be reduced or alkylated by the similar procedure, such as L10:

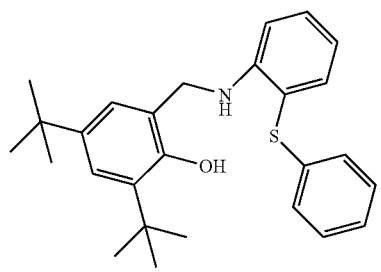

L10

Anal.:Found (Calcd): C, 77.68 (77.28); H, 7.85 (7.93); N, 3.03 (3.34); $^1$H NMR (300 MHz CDCl$_3$): δ7.6-7.0 (m, Aryl-H), 5.1 (br s), 4.33 (s, CH$_2$), 1.33 (s, t-Bu-H), 1.31 (s, t-Bu-H).

Example 10

Synthesis of Ligand L11

To a solution of (o-aminophenyl) diphenylamine 2.77 g (10.0 mmol) and compound (h) 3.92 g (12.0 mmol) in ethanol (15 ml), zeolite and a few drops of acetic was added to the mixture, refluxing and heating for 3 h, remove the solvent and the crude product was purified by column chromatography of silica gel to give L11.

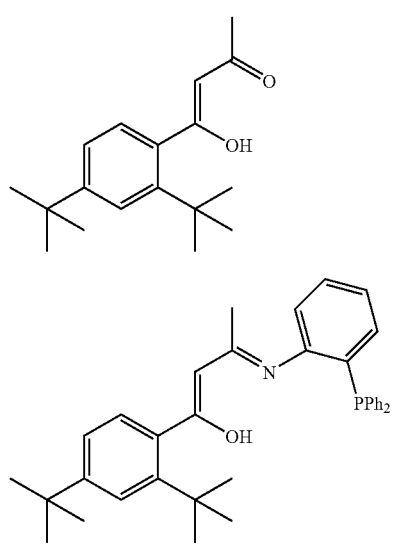

(h)

L11

Anal.: Found (Calcd.): C, 81.00 (81.02); H, 7.43 (7.55); N, 2.51 (2.62); $^1$H NMR (300 MHz CDCl$_3$): 7.6-6.9 (m, 17H), 5.36 (s, 1H), 2.10 (s, 3H), 1.44 (s, t-Bu-H), 1.38(s, 9H, 9H).

Example 11

Synthesis of Ligand L12

To a solution of m-CBPA 650mg (0.31mmol) in CH$_2$Cl$_2$ 5 ml was added L4 125 mg (0.3 mmol) in the solution of CH$_2$Cl$_2$ 10 ml at temperature of 0-5° C. The resultant mixture was stirred for additional 1 h under the temperature of 0-5° C. The crude product was purified by column chromatography to give L12, 730 mg (57.3%).

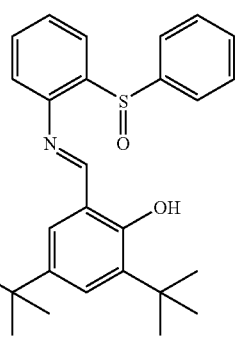

L12

Anal.: Found (Calcd) C, 74.77 (74.79); H, 7.20 (7.21); N, 3.33 (3.23); $^1$H NMR (300 MHz CDCl$_3$): 11.6 (s, O—H), 8.2 (s, CH=N), 8.0-7.0 (m, Aryl-H), 1.35 (s, t-Bu-H), 1.28 (s, t-Bu-H).

Example 12

Synthesis of Ligand L13

A solution of O-aminophenyl diphenylphosphine in benzene can give O-aminophenyl diphenyloxygenphosphine quantitatively under the effect of H$_2$O$_2$ (30%). By the same procedure as ligand L1, L13 was prepared and purified by column chromatography, 560 mg (64%).

L13

Anal.: Found (Calcd): C, 77.87 (77.77); H, 7.14 (7.12); N, 2.71 (2.75). $^1$H NMR (300 MHz CDCl$_3$): 11.7 (s, O—H), 8.2 (s, CH=N), 7.75-7.0 (m, Aryl-H), 1.33 (s, t-Bu-H), 1.28 (s, t-Bu-H).

Example 13

Synthesis of Ligand L14

To a solution of phenyl-2-aminophenylsulfide 2.01 g (10.0 mmol) was added concentrated HCl 5 ml and H$_2$O 10 ml in a flask of 100 ml, the solution of NaNO₂ 0.76 g (1.0 mmol) in the H₂O 2.5 ml was slowly added to the mixture. The mixture was stirred at temperature of 0° C. for 2 h to give diazonium salt. In another flask, to 2,4-di-ter-butylphenol 2.17 g (10.5 mmol) and the solution of NaOH 0.4 g in H₂O 5 ml was added the solution of Na₂CO₃ 2.65 g in H₂O 10 ml slowly. At 0° C., added dropwise the diazonium salt to the anionic solution. The mixture was stirred for 3 h at 0° C. and warmed to room temperature, then filtered; the solid was recrystallized to give L14, 3.1 g (75%).

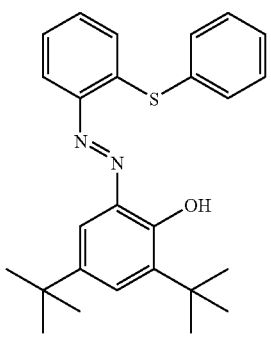

L14

Anal.: Found (Calcd): C, 74.70 (74.60); H, 7.11 (7.22); N, 6.56 (6.69); ¹H NMR (300 MHz CDCl₃): δ13.3 (s, OH), 7.8-7.1 (m, Aryl-H), 1.4 (s, t-Bu-H), 1.3 (s, t-Bu-H).

Example 14

Synthesis of Ligand L15

To the solution of L9 6.2 g (12.5 mmol) in CH₂Cl₂ was added H₂O₂ 20 ml (30%), stirred quickly for 4 h, separated the solvent, the organic layer was condensed to give ligand L15 quantitatively.

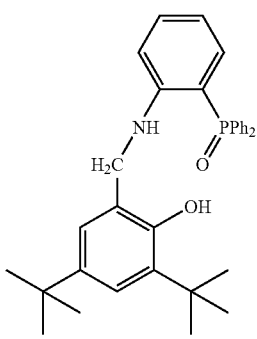

L15

Anal.: Found (Calcd) C, 77.48 ((77.47); H, 7.29 (7.49); N, 3.03 (2.74); ¹H NMR (300 MHz CDCl₃): δ7.7-6.7 (m, Aryl-H), 4.3 (d, CH₂N), 1.28 (s, t-Bu-H).

Example 15

Synthesis of Ligand L16

To a mixture of NaH (4.0 mmol) and ligand L15 1.02 g (2.0 mmol) at −78° C., was added a solution of THF (30 ml). The mixture was warmed to room temperature and stirred for an additional 2 h, then CH3I (0.23 ml, 4.0 mmol) was added. The mixture was stirred for an additional 2 h, Then diatilled water was added and extracted by CH₂Cl₂, organic layer was dried by anthydrous Na₂SO₄, removed the solvent, the crude product was purified by column chromatography to give L16.

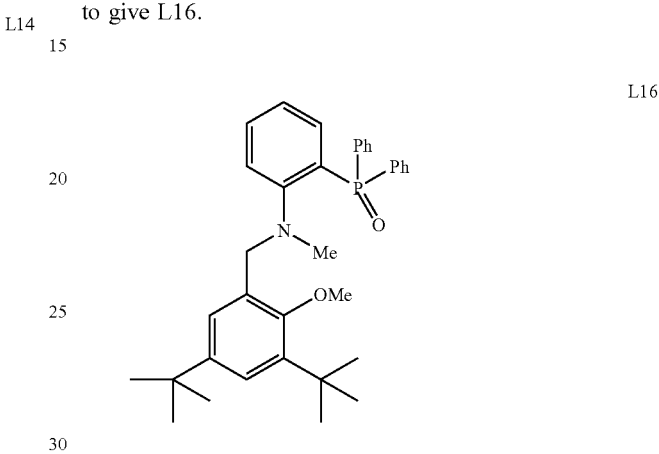

L16

Anal.: Found (Calcd): C, 77.75 ((77.89); H, 7.88 (7.84); N, 2.69 (2.60); ¹H NMR (300 MHz CDCl₃): δ7.7-6.9 (m, Aryl-H), 4.3 (s, CH₂), 3.6 (s, Ome), 2.2 (s, Me), 1.3(s, t-Bu-H), 1.2 (s, t-Bu-H).

Example 16

Synthesis of Ligand L17

To the solution of ligand L16 537 mg (1.0 mmol) in toluene was added HSiCl₃ 0.5 ml (5.0 mmol) at 0° C. After refluxing and stirring overnight, cooled to room temperature, added ether 40 ml and saturated aqueous of NaHCO₃ 15 ml, filtered and removed the solvent, the crude product was purified by column chromatography to give L17.

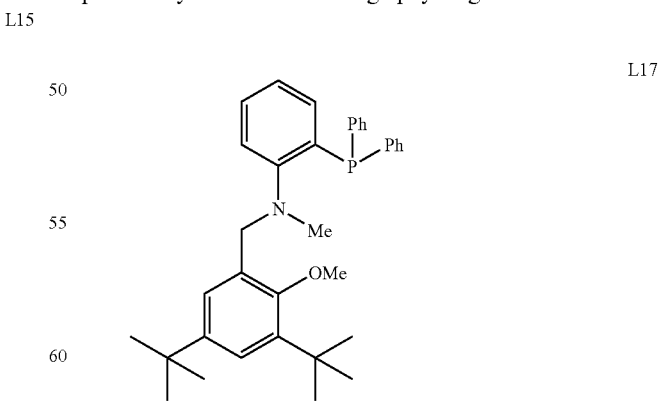

L17

Anal.: Found (Calcd) C, 80.41 (80.270; H, 8.15 (8.08); N, 2.51 (2.67); ¹H NMR (300 MHz CDCl₃): δ7.5-6.8 (m, Aryl-H), 4.2 (s, CH₂), 3.7 (s, OMe), 2.5 (s, NMe), 1.5 (s, t-Bu-H), 1.2 (s, t-Bu-H).

Example 17
L18, L19, L20, L28, L29, L30, L31, L32, L33, L34, L35, L36 were Synthesized by the same Procedure as L1.
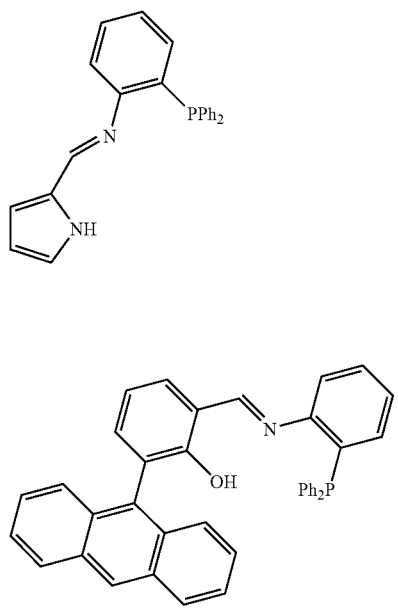
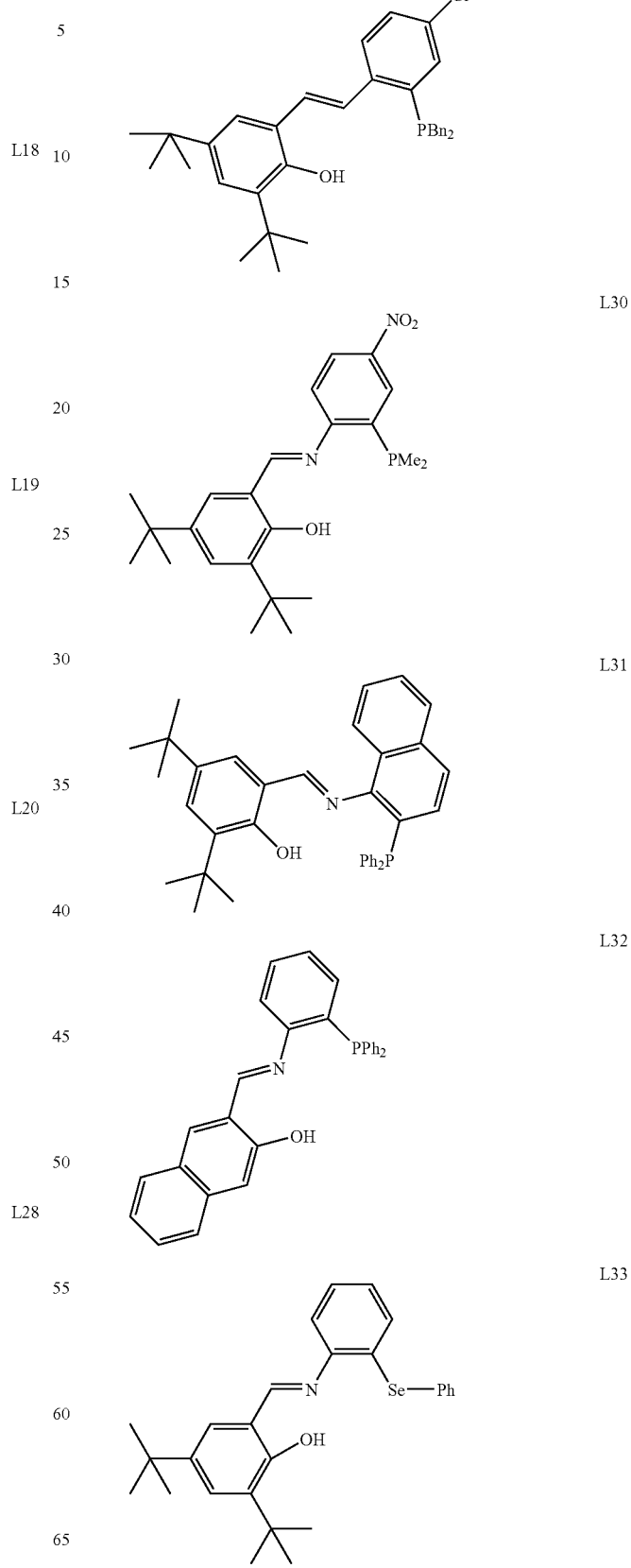

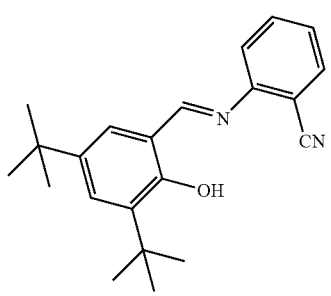
L34

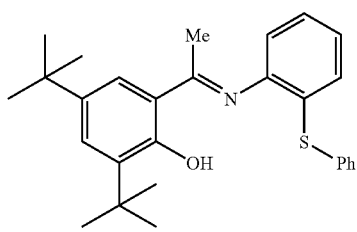
L35

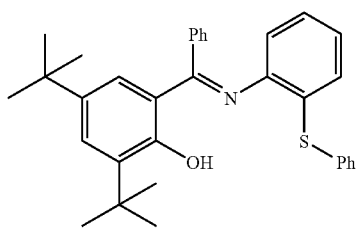
L36

Part of analysis results of L18-L34:

Anal., Found (Calcd); $^1$H NMR, 300 MHz CDCl$_3$.

L18: C, 77.84 (77.95); H, 5.31 (5.400; N, 7.66 (7.90); 8.1 (s, CH=N), 7.4-6.2 (m, Aryl-H), 1.9 (broad s, N—H).

L19: C, 83.75 (84.00); H, 5.38 (5.06); N, 2.87 (2.51); 13.5 (s, OH), 8.4 (s, CH=N), 8.9-7.0 (m, Aryl-H);

L20: C, 63.91 (63.89); H, 5.13 (5.16); N, 2.73 (2.76); 13.9 (s, OH), 8.3 (s, CH=N), 8.8-7.0 (m, Aryl-H), 1.5 (s, t-Bu-H), 1.3 (s, t-Bu-H);

L28: 8.3 (s, CH=N), 7.6-6.9 (m, Aryl-H), 1.4 (s, t-Bu-H), 1.3 (PMe);

L29: 8.3 (s, CH=N), 7.5-6.9 (m, Aryl-H), 3.0 (s, CH$_2$), 1.4 (s, t-Bu-H), 1.3 (s, t-Bu-H);

L30: 8.4 (s, CH=N), 8.3-7.1 (m, Aryl-H), 1.4 (s, t-Bu-H), 1.3 (s, Me);

L31: 8.4 (s, CH=N), 7.9-6.6 (m, Aryl-H), 1.31 (s, t-Bu-H), 1.29 (s, t-Bu-H);

L32: 9.3 (s, CH=N), 8.0-6.9 (m, Aryl-H);

L33: 13.2 (s, OH), 8.6 (s, CH=N), 7.6-7.1 (m, Aryl-H), 1.5 (s, t-Bu-H), 1.35 (s, t-Bu-H);

L34: C, 78.85 (79.00); H, 7.85 (7.84); N, 8.33 (8.38).

Example 18

Synthesis of Ligand L21

To a solution of ligand L10 490 mg (1.0 mmol) in THF (5 ml) at −78° C., was added NaH (1.0 mmol) in 5 ml of THF. The resulting solution was allowed to warm to room temperature and stirred for 2 h, and then a solution of Me$_3$SiCl (1.0 mmol) in 5 ml of THF was slowly added to the said solution. Refluxing 2 hr and the solution was added to NaH (1 mmol) in THF of 5 ml, refluxing 10 h, and cooled to room temperature. To the solution was added aqueous HI (44%), after refluxing and stirring for 12 h, stopped the reaction and the crude product was purified by column chromatography to give L21.

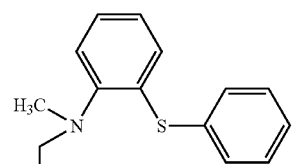
L21

Anal.: Found (Calcd) C, 80.25 (80.13); H, 7.88 (7.91); N, 2.75 (2.73). $^1$H NMR (CDCl$_3$): 7.7-6.8 (m, Aryl-H), 4.0 (s, 2H), 2.5 (s, 3H), 1.4 (s, 9H), 1.3 (s, 9H).

Example 19

Synthesis of Ligand L22

To a solution of ligand L10 (838 mg, 2.0 mmol) in THF of 10 ml at −78° C., was added a solution of NaH (88 mg, 2.0 mmol) in THF of 5 ml, the mixture was allowed to warm to room temperature and stirred for an additional 1 h, then CH$_3$I was slowly added to the system, Stopped the reaction after refluxing 10 h, filtered and dried with anhydrous Na$_2$SO$_4$, filtered and removed the solvent, a few petroleum ether was added to give L22 (72%).

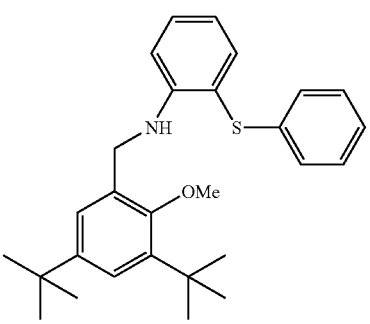
L22

Anal.: Found (Calcd) C, 77.25 (77.55); H, 8.18 (8.14); N, 3.35 (3.23); $^1$H NMR (CDCl$_3$): 7.5-6.7 (m, Ary-H), 5.3 (br s, NH), 4.34 (s, 2H), 3.7 (s, 3H), 1.4 (s, t-Bu-H), 1.2 (s, t-Bu-H).

Example 20

Synthesis of Ligand L27

To a solution of ligand L9 (6.2 g, 12.5 mmol) in CH$_2$Cl$_2$, was added H$_2$O$_2$ of 20 ml (30%), stirred quickly for 4 h, separated the solvent, organic layer was condensed to give ligand L23 quantitatively.

To a solution of ligand L23 (509 mg, 1.0 mmol) in THF of 15 ml at −78° C., was added a solution of NaH (1.0 mmol) in THF of 5 ml, the mixture was allowed to warm to room temperature and stirred for an additional 2 h, then a solution of Me$_3$SiCl (0.33 ml, 2.5 mmol) in THF of 15 ml was added to the anionic solution, refluxing 2 h. The crude product was purified by column chromatography to give L24 (350 mg, 60%).

To a solution of ligand L24 (583 mg, 1.0 mmol) in THF of 15 ml at −78° C., was added a solution of NaH (1.0 mmol) in THF of 5 ml, the mixture was allowed to warm to room temperature, after stirring for an additional 2 h, a solution of Me$_2$NCH$_2$CH$_2$Cl.HCl (144 mg, 1.0 mmol) was added to the anionic solution, refluxing 2 h. The crude product was purified by column chromatography to give L25.

To a solution of ligand L25 (292 mg, 0.5 mmol) in THF of 10 ml, was added aqueous solution of HI (44%), refluxing for 12 h. The crude product was purified by column chromatography to give L26.

L27 was prepared by the same method as L17.

L23
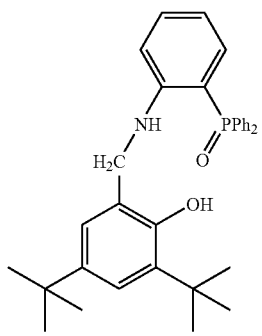

L24
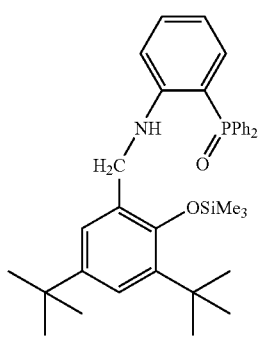

L25
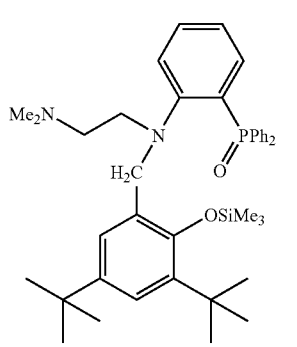

L26
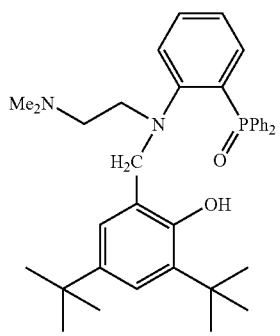

L27
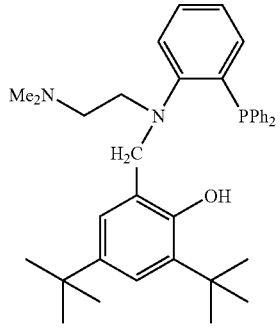

Anal.: Found (Calc.) for L27: C, 78.35 (78.41); H, 8.37 (8.36); N, 5.06 (4.94); $^1$H NMR (300 MHz CDCl$_3$): 7.7–6.7 (m, Aryl-H), 3.9 (s, 2H), 2.6 (t, 2H), 2.2 (t, 2H), 1.9 (s, 3H), 1.4 (s, 9H), 1.3 (s, 9H).

Example 21

Synthesis of Complex A-1

A solution of ligand L1 (740.5 mg, 1.5 mmol) in THF of 10 ml was added to KH (60 mg, 1.5 mmol) in THF of 10 ml at 0° C., stirred for an additional 1 h at room temperature. After the solvent was removed under vacuum, 30 ml of toluene was added to the residue, and then a solution of TiCl$_4$ 0.20 ml (0.18 mmol) in toluene (30 ml) was added drop wise to the said solution at room temperature, the mixture was stirred for 3 h at room temperature. The solvent was removed under vacuum, the crude product was dissolved in CH$_2$Cl$_2$ (40 ml), centrifugalizing, and the organic layer was removed the solvent under vacuum to give orange red crude product, washed with hexane, toluene/hexane to give orange red solid 760 mg (78.3%).

A-1

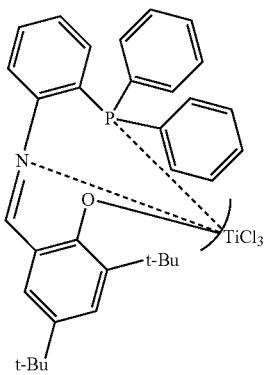

Anal. Found (Calcd.) C, 60.36 (61.27); H, 6.01 (5.45); N, 2.01 (2.16); $^1$H NMR (300 MHz CDCl$_3$): δ8.2 (s, CH=N), 7.8-7.0 (m, Aryl-H), 1.51 (s, t-Bu-H), 1.34 (s, t-Bu-H).

Complex A-1 isomerizated under the action of dry hydrochloric to give complex J-1:

J-1

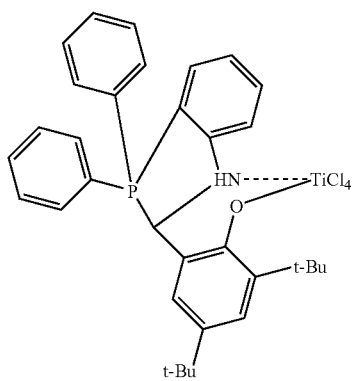

Table 1 and FIG. 1. give the X-ray analysis of Complex J-1.

TABLE 1

| bond length and bond angle | | | |
|---|---|---|---|
| Ti—O | 1.798(4) | N—C(6) | 1.447(7) |
| Ti—Cl(1) | 2.2583(19) | N—C(7) | 1.522(6) |
| Ti—Cl(4) | 2.279(2) | Cl(1)—Ti—Cl(4) | 98.46(8) |
| Ti—Cl(2) | 2.3720(18) | Cl(1)—Ti—Cl(2) | 94.45(7) |
| Ti—Cl(3) | 2.4119(19) | Cl(4)—Ti—Cl(2) | 91.07(7) |

Anal. Found (Calcd.) C, 58.31 (58.01); H, 5.28 (5.31); N, 2.02 (2.05); X-ray: See FIG. 1.

Example 22

Synthesis of Complex A-2

A solution of ligand L2 (476 mg, 1.0 mmol) in 15 ml of THF was added to KH 43 mg (1.1 mmol) in 15 ml of THF slowly at −78° C., stirred for 3 h at room temperature. The solvent was removed under vacuum, following 40 ml of toluene was added to the residue, the solution was added drop wise to a solution of TiCl$_4$ 0.11 ml (1.0 mmol) in 40 ml of toluene at 50° C., stirred for additional 3 h at 50° C., centrifugalizing and the organic layer was removed the solvent to give the crude product, recrystallized from CH$_2$Cl$_2$/hexane to give complex A-2, 380 mg (60%).

A-2

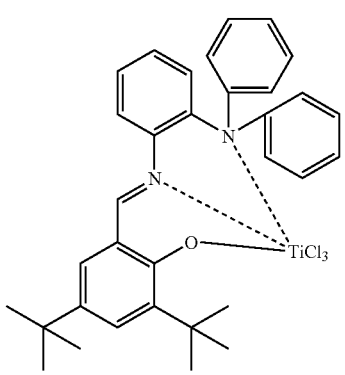

Anal. Found (Calc.) C, 62.05 (62.93); H, 5.03 (5.60); N, 7.25 (7.60); $^1$H NMR (300 MHz CDCl$_3$): δ8.3 (s, CH=N), 7.7-6.9 (m, Aryl-H), 1.6 (s, t-Bu-H), 1.3 (s, t-Bu-H).

Example 23

Synthesis of Complex B-1

A solution of ligand L1 300 mg (0.6 mmol) in 10 ml of THF was added drop wise to a solution of NaH (0.6 mmol) in 10 ml of THF at 0° C., stirred for 1 h at room temperature, the solution was added to a solution of ZrCl$_4$.2THF 261.7 mg (0.6 mmol) in 15 ml of THF dropwise, stirring at 0° C. for 0.5 h then refluxing 7 h, the solvent was removed in vacuum, the mixture was dissolved in 20 ml of CH$_2$Cl$_2$, centrifugalizing and the organic layer was concentrated, cooled to give pale yellow crude product, recrystallized from CH$_2$Cl$_2$/hexane to give complex B-1, 97.8 mg (23.6%).

B-1

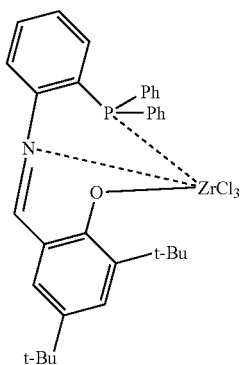

Anal. Found (Calc.) C, 56.91 (57.43); H, 5.24 (5.11); N, 2.23 (2.03), Cl, 15.62 (15.41). $^1$H NMR (300 MHz CDCl$_3$): δ8.3 (s, CH=N), 7.8-7.0 (m, Aryl-H), 1.5 (s, t-Bu-H), 1.3 (s, t-Bu-H).

Example 24

Synthesis of Complex B-2

A solution of ligand L2 (476 mg, 1.0 mmol) in 50 ml of THF, was added drop wise to a suspension of KH (43 mg, 1.1 mmol) in 15 ml of THF at −78° C., stirred for 3 h at room temperature. The solution was added drop wise to a solution of ZrCl$_4$.2THF (1.0 mmol) in 15 ml of THF, refluxing 10 h, the solvent was removed under vacuum, the residue was dissolved completely in 20 ml of CH$_2$Cl$_2$, centrifugalizing and the organic layer was concentrated, a few drops of hexane was added to the mixture, cooled to give crude product, the crude product was recrystallized to give complex B-2, 215 mg (32%)

B-2

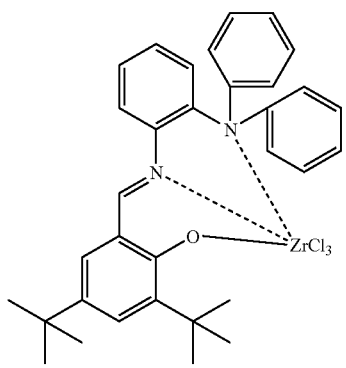

Anal. Found (Calc.) C, 57.91 (58.87); H, 5.04 (5.24); N, 4.23 (4.16), Cl, 15.31 (15.80); $^1$H NMR (300 MHz CDCl$_3$): δ8.4 (s, CH=N), 8.0-6.9 (m, Aryl-H), 1.6 (s, t-Bu-H), 1.3 (s, t-Bu-H).

Example 25

A-3, A-4, A-5, A-6, A-7, A-9, A-11, A-13, A-14, A-18, A-19, A-20, A-21, A-28, A-29, A-30, A-31, A-32, A-33, A-34, A-35, A-36 were synthesized as the said general procedure of A-1.

A-3

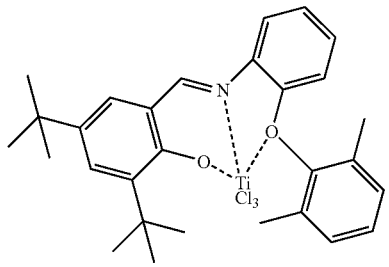

A-4

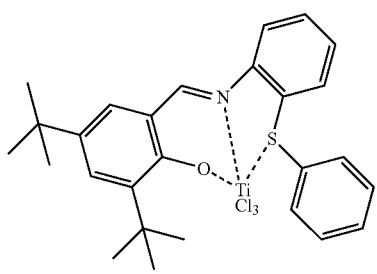

-continued

A-5

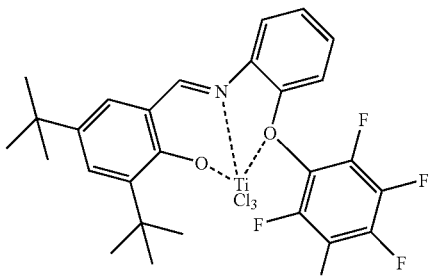

A-6

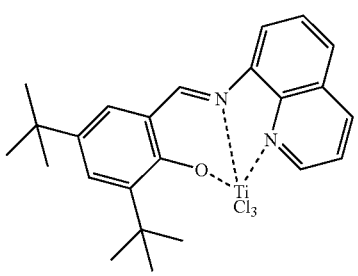

A-7

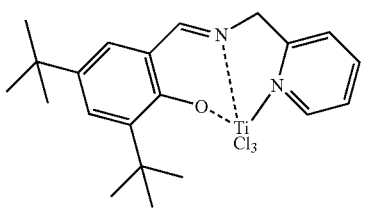

A-9

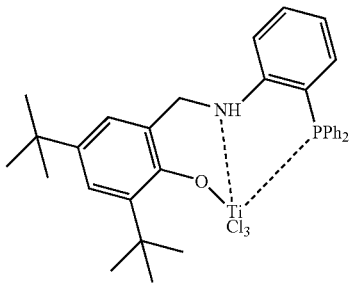

A-11

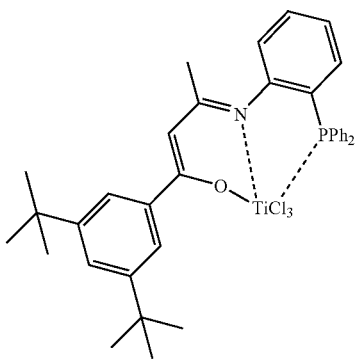

-continued
A-13
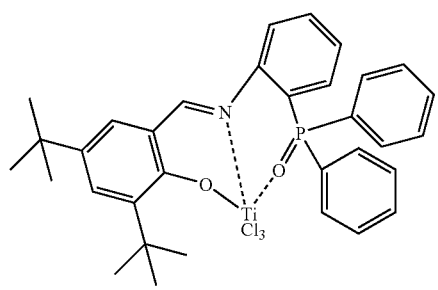
A-14
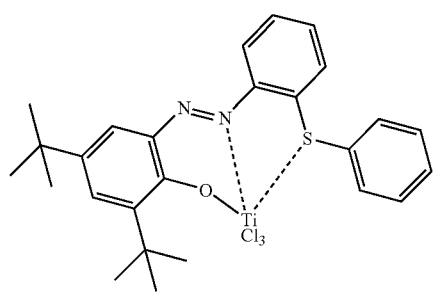
A-18
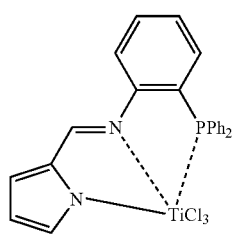
A-19
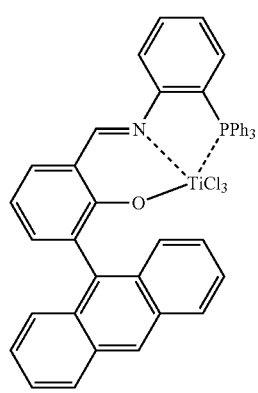
A-20
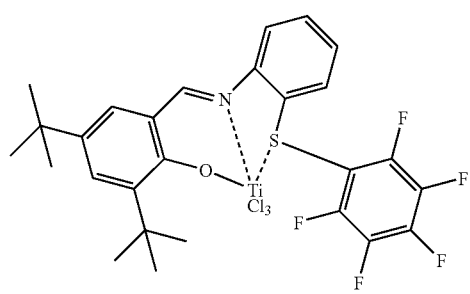
-continued
A-21
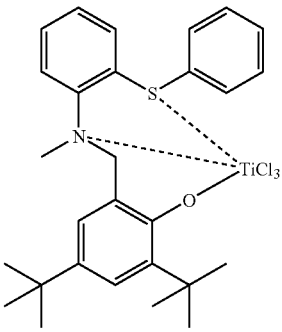
A-28
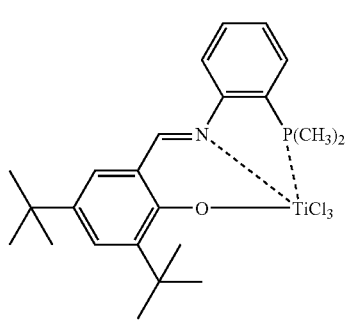
A-29
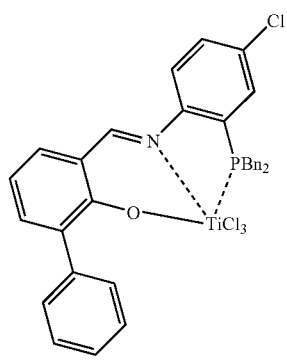
A-30
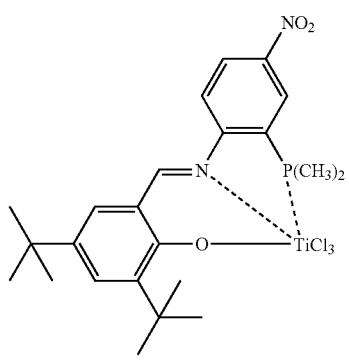

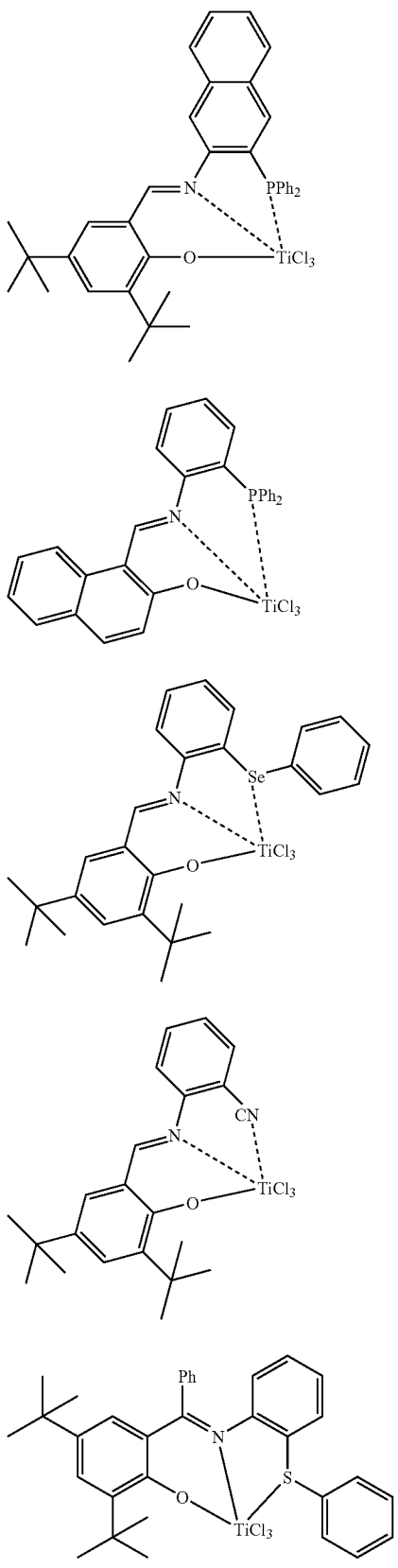
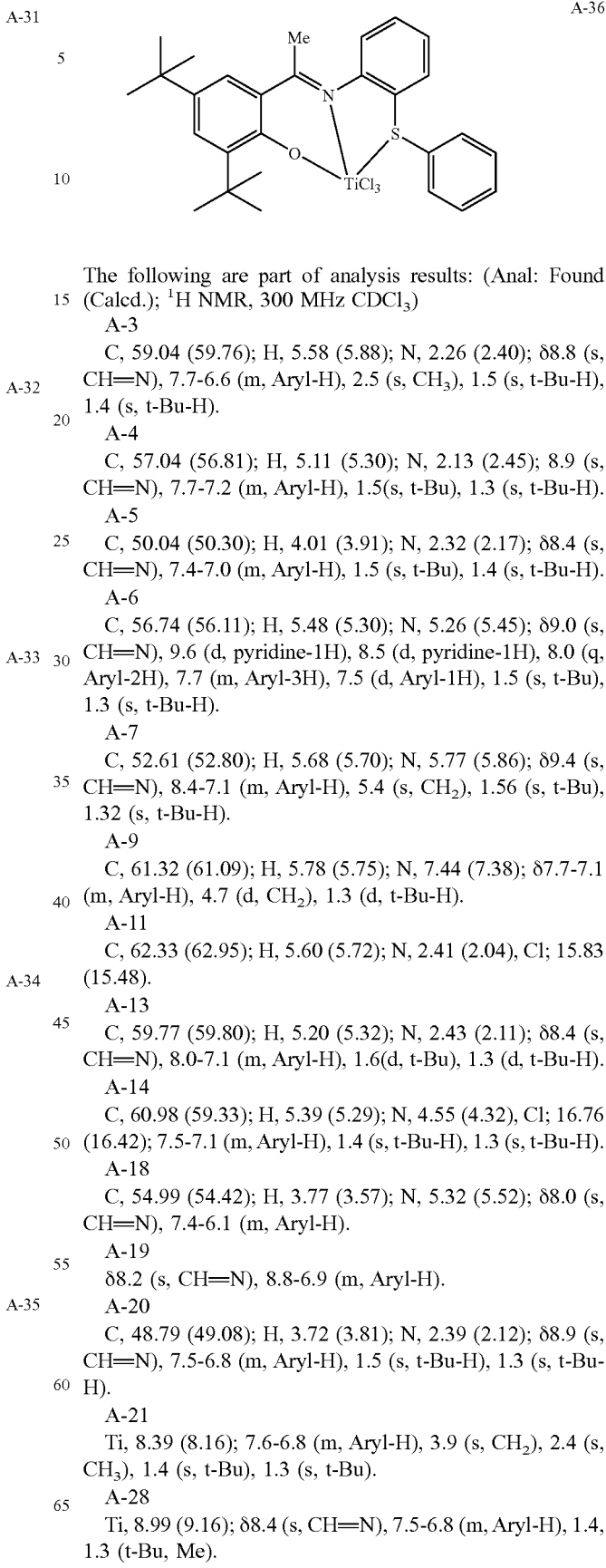

The following are part of analysis results: (Anal: Found (Calcd.); $^1$H NMR, 300 MHz CDCl$_3$)

A-3
C, 59.04 (59.76); H, 5.58 (5.88); N, 2.26 (2.40); δ8.8 (s, CH=N), 7.7-6.6 (m, Aryl-H), 2.5 (s, CH$_3$), 1.5 (s, t-Bu-H), 1.4 (s, t-Bu-H).

A-4
C, 57.04 (56.81); H, 5.11 (5.30); N, 2.13 (2.45); 8.9 (s, CH=N), 7.7-7.2 (m, Aryl-H), 1.5(s, t-Bu), 1.3 (s, t-Bu-H).

A-5
C, 50.04 (50.30); H, 4.01 (3.91); N, 2.32 (2.17); δ8.4 (s, CH=N), 7.4-7.0 (m, Aryl-H), 1.5 (s, t-Bu), 1.4 (s, t-Bu-H).

A-6
C, 56.74 (56.11); H, 5.48 (5.30); N, 5.26 (5.45); δ9.0 (s, CH=N), 9.6 (d, pyridine-1H), 8.5 (d, pyridine-1H), 8.0 (q, Aryl-2H), 7.7 (m, Aryl-3H), 7.5 (d, Aryl-1H), 1.5 (s, t-Bu), 1.3 (s, t-Bu-H).

A-7
C, 52.61 (52.80); H, 5.68 (5.70); N, 5.77 (5.86); δ9.4 (s, CH=N), 8.4-7.1 (m, Aryl-H), 5.4 (s, CH$_2$), 1.56 (s, t-Bu), 1.32 (s, t-Bu-H).

A-9
C, 61.32 (61.09); H, 5.78 (5.75); N, 7.44 (7.38); δ7.7-7.1 (m, Aryl-H), 4.7 (d, CH$_2$), 1.3 (d, t-Bu-H).

A-11
C, 62.33 (62.95); H, 5.60 (5.72); N, 2.41 (2.04), Cl; 15.83 (15.48).

A-13
C, 59.77 (59.80); H, 5.20 (5.32); N, 2.43 (2.11); δ8.4 (s, CH=N), 8.0-7.1 (m, Aryl-H), 1.6(d, t-Bu), 1.3 (d, t-Bu-H).

A-14
C, 60.98 (59.33); H, 5.39 (5.29); N, 4.55 (4.32), Cl; 16.76 (16.42); 7.5-7.1 (m, Aryl-H), 1.4 (s, t-Bu-H), 1.3 (s, t-Bu-H).

A-18
C, 54.99 (54.42); H, 3.77 (3.57); N, 5.32 (5.52); δ8.0 (s, CH=N), 7.4-6.1 (m, Aryl-H).

A-19
δ8.2 (s, CH=N), 8.8-6.9 (m, Aryl-H).

A-20
C, 48.79 (49.08); H, 3.72 (3.81); N, 2.39 (2.12); δ8.9 (s, CH=N), 7.5-6.8 (m, Aryl-H), 1.5 (s, t-Bu-H), 1.3 (s, t-Bu-H).

A-21
Ti, 8.39 (8.16); 7.6-6.8 (m, Aryl-H), 3.9 (s, CH$_2$), 2.4 (s, CH$_3$), 1.4 (s, t-Bu), 1.3 (s, t-Bu).

A-28
Ti, 8.99 (9.16); δ8.4 (s, CH=N), 7.5-6.8 (m, Aryl-H), 1.4, 1.3 (t-Bu, Me).

A-29

Ti, 7.31 (7.11); δ8.7 (s, CH=N), 7.6-6.8 (m, Aryl-H), 2.8 (s, CH₂).

A-30

Ti, 8.20 (8.43); δ8.4 (s, CH=N), 8.0-6.9 (m, Aryl-H), 1.5 (s, t-Bu-H), 1.3 (s, Me).

A-31

Ti, 7.01 (6.87); δ8.4 (s, CH=N), 7.9-7.1 (m, Aryl-H), 1.4 (s, t-Bu-H), 1.3 (s, t-Bu).

A-32

Ti, 8.07 (8.19); 9.2 (s, CH=N), 7.9-6.9 (m, Aryl-H).

A-33

Ti, 7.78 (7.75); 8.8 (s, CH=N), 7.7-7.2 (m, Aryl-H), 1.5 (s, t-Bu-H), 1.35 (s, t-Bu-H).

A-34

Ti, 8.91 (9.82); δ8.3 (s, CH=N), 7.7-6.9 (m, Aryl-H), 1.5 (s, t-Bu-H), 1.3 (s, t-Bu).

A-35

C, 57.28 (57.50); H, 5.67 (5.51); N, 2.17 (2.39); δ7.7 (s, CH=N), 7.6-0.15 (m, Aryl-H), 2.7(s, e-H), 1.5 (s, t-Bu-H), 1.3 (s, t-Bu-H).

A-36

C, 60.90 (61.27); H, 5.79 (5.30); N, 2.42 (2.17); δ7.7 (s, CH=N), 7.5-6.8 (m, Aryl-H), 1.6 (s, t-Bu-H), 1.16 (s, t-Bu-H).

Example 26

B-6 (35%); B-9 (52%); B-13 (38%); B-19 (23%) were prepared as the said general procedure.

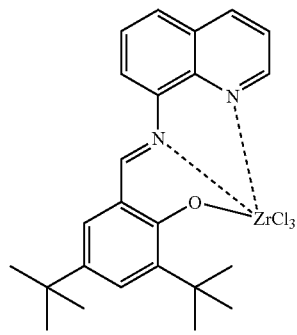

B-6

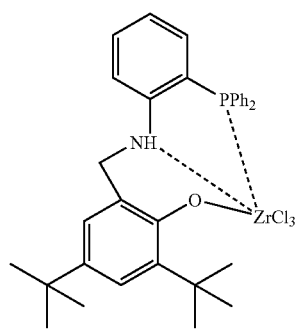

B-9

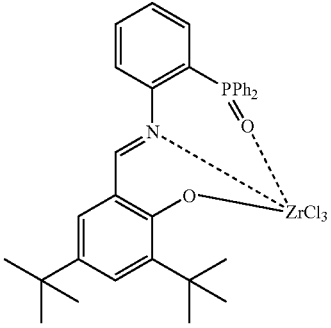

B-13

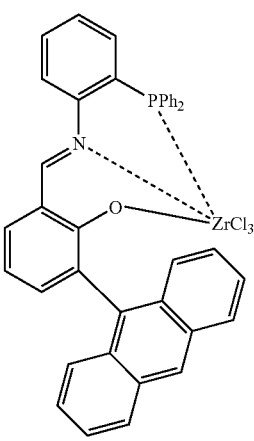

B-19

The following are part of analysis results: (Anal.: Found (Calc.); ¹H NMR, 300 MHz CDCl₃)

B-6

δ9.1 (s, CH=N), 9.6 (d, pyridine-1H), 8.6 (d, pyridine-1H), 7.9-7.3 (m, Aryl-H).

B-9

C, 58.01 (57.26); H, 5.78 (5.39); N, 1.77 (2.02); δ7.8-6.6 (m, Aryl-H), 1.2 (s, t-Bu-H).

B-13

δ8.4 (s, CH=N), 8.1-7.0 (m, Aryl-H), 1.5 (d, t-Bu-H), 1.3 (d, t-Bu-H).

B-19

δ8.1 (s, CH=N), 8.6-6.5 (m, Aryl-H).

Example 27

Synthesis of Complex C-1

To a solution of ligand L1 300 mg (0.6 mmol) in THF of 10 ml at 0° C., was added NaH (0.6 mmol) in THF of 10 ml, stirred for additional 1 h at room temperature, after the solvent was removed under vacuum, 25 ml of acetonitrile was added to the residue, the anionic solution was added to a solution of FeCl₃ (97 mg, 0.6 mmol) in CH₃CN at 0° C., the mixture was stirred at room temperature overnight. The mixture was heated to 80° C. and stirred for an additional 1 h, cooled slowly and filtered, the solvent was concentrated to give C-1, 296 mg (79.6%).

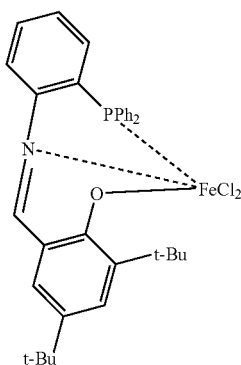

C-1

Anal.: Found (Calc.) C, 70.80 (71.48); H, 7.46 (7.45); N, 5.49 (5.75).

Example 28

Synthesis of Complex D-1

To a solution of ligand L1 300 mg (0.6 mmol) in 10 ml of THF at 0° C., was added dropwise a solution of NaH (0.6 mmol) in 10 ml of THF, stirred for 1 h at room temperature, the anionic solution was added to a solution of FeCl₂ (76 mg, 0.6 mmol) in 10 ml of THF, stirred for 40 h at room temperature, the solvent was removed under vacuum, the mixture was dissolved in 20 ml of CH₂Cl₂, filtered to give clear green solution, concentrated to give D-1, 135 mg (38.5%).

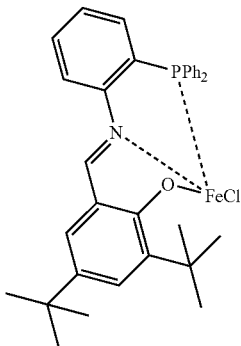

D-1

Anal.: Found (Calc.) C, 66.80 (67.08); H, 6.46 (6.04); N, 2.49 (2.40), Cl; 6.55 (6.07).

Example 29

Synthesis of Complex D-8

A solution of ligand L8 159 mg (0.37 mmol) in 15 ml of THF was added to a suspension of KH 15 mg (0.37 mmol) in 5 ml of THF at −78° C., warmed slowly to room temperature, stirred for 1 h, anhydrous FeCl₂ was added to the anionic solution, stirred overnight and anhydrous ethyl ether was added, centrifugalizing, the organic layer was removed solvent, the crude product was recrystallized from CH₂Cl₂/hexane to give complex D-8, 208 mg (68%).

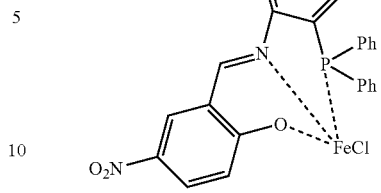

D-8

Anal. Found: (Calc.): C, 57.48 (58.11); H, 3.39 (3.51); N, 5.41 (5.42), Fe, 10.46 (10.81).

Example 30

D-16 (83%), D-18 (57%), D-21 (69%), D-22 (80%) were prepared by the said general procedure.

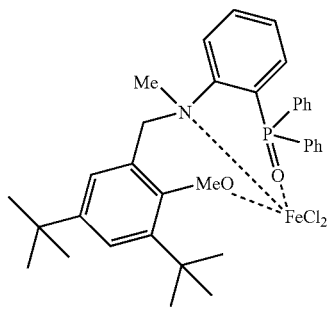

D-16

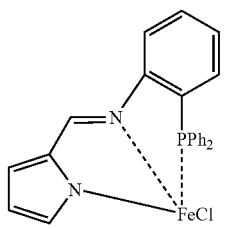

D-18

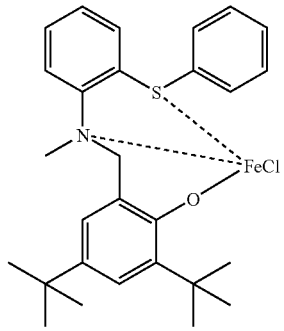

D-21

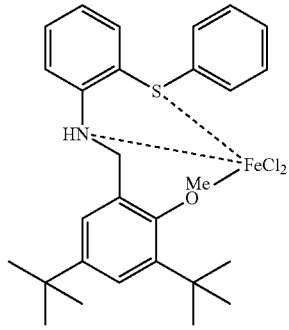

D-22

The following are part of analysis results:
D-16
Fe, 8.44 (8.38); FID-MS (M+): 666.
D-18
Fe, 12.41 (12.56); FID-MS (M+): 444.
D-21
Fe, 9.98 (10.66); FID-MS (M+): 523.
D-22
Fe, 9.41 (9.97); FID-MS (M+): 560.

Example 31

Synthesis of Complex E-9

A solution of ligand L2 476 mg (1.0 mmol) in 50 ml of THF was added drop wise to a suspension of KH 43 mg (1.1 mmol) in 15 ml of THF at −78° C., stirred for 3 h at room temperature. The anionic solution was added drop wise to a solution of ZrCl$_4$.2THF (1.0 mmol) in 15 ml of THF, after refluxing and stirring overnight, the solvent was removed under vacuum, the residue was dissolved completely in 20 ml of CH$_2$Cl$_2$, centrifugalizing, the organic layer was concentrated, a few drops of hexane was added to the mixture, cooled to give crude product, the crude product was recrystallized to give complex B-2, 215 mg (32%).

Analogues were synthesized by the said general procedure.

Example 32

Synthesis of Complex F-1

A solution of ligand L1 800 mg (1.62 mmol) in 20 ml of THF was added to a suspension of NaH (1.62 mmol) in 10 ml of THF at 0° C. to give yellow anionic solution, stirred for 1 h at room temperature, a solution of TiCl$_4$ 0.09 ml (0.8 mmol) in 5 ml of THF was added to the said solution, stirred for an additional 3 h at room temperature. The solvent was removed under vacuum, the mixture was dissolved in 20 ml of CH$_2$Cl$_2$, centrifugalizing and the organic layer was concentrated under vacuum, cooled to give yellow crude product, recrystallized from toluene to give grange yellow product 550 mg (62.3%).

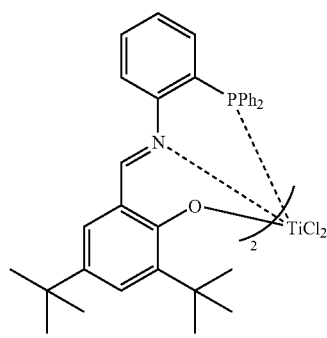

F-1

Anal.: Found (Calc.) C, 70.91 (71.81); H, 6.64 (6.39); N, 2.21 (2.54); $^1$H NMR (300 MHz CDCl$_3$): δ8.1 (s, HC=N), 7.6-7.0 (m, Aryl-H), 1.2 (s, t-Bu-H), 1.1 (s, t-Bu-H).

Analogues were synthesized by the said general procedure.

Example 33

Synthesis of Complex G-1

A solution of ligand L1 300 mg (0.6 mmol) in 10 ml of THF was added to a suspension of NaH (0.6 mmol) in 10 ml of THF at 0° C., stirred for 1 h at room temperature, the solution was added to ZrCl$_4$.2THF (0.3 mmol) in 3 ml of THF, after remaining the temperature of 0° C. for 0.5 h, refluxing for 5.5 h, the solvent was removed under vacuum, the mixture was dissolved in 20 ml of CH$_2$Cl$_2$, centrifugalizing, cooled to give yellow crude product, recrystallized from CH$_2$Cl$_2$/hexane to give G-1, 94 mg (27.3%).

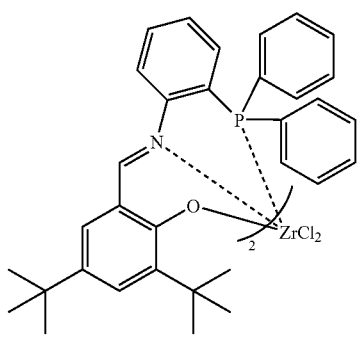

G-1

Anal. Found: (Calc.) C, 68.98 (69.09); H, 6.17 (6.15); N, 2.49 (2.44); FID-MS (M+): 1148.

Analogues were synthesized by the said general procedure

Example 34

Synthesis of Complex H-1

A solution of ligand L1 591 mg (1.2 mmol) in THF of 10 ml was added to a suspension of NaH (1.2 mmol) in THF of 10 ml at 0° C., stirred for an additional 1 h at room temperature, a solution of (Ph$_3$P)$_2$NiPhCl (780 mg, 1.1 mmol ) in 10 ml of THF was added to the anionic solution, stirred overnight at room temperature, and then refluxed for 1 h, cooled to room temperature and filtered, the solvent was removed under vacuum, the residue was dissolved in 20 ml of hexane and filtered, the filtrate was concentrated to give H-1, 325 mg (47%).

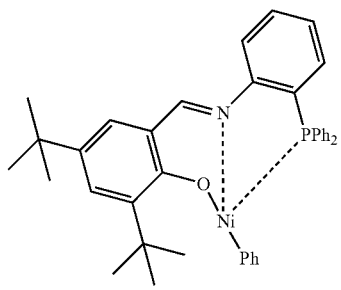

H-1

Anal.: Found (Calc.) C, 73.80 (74.54); H, 7.46 (7.45); N, 5.49 (5.75).

Analogues were synthesized by the said general procedure.

Example 35

To a solution of complex A-9 200 mg in 10 ml THF at −78° C., was added MeMgBr (4 equiv.) in ethyl ether of 5 ml, warmed to room temperature, stirred overnight, the solvent was removed under vacuum, filtered and the filtrate was concentrated to give trialkylate compound of A-9, 325 mg (47%).

Anal.: $^1$H NMR (300 MHz $C_6D_6$): δ9.1 (s, CH═N), 7.8-6.8 (m, Aryl-H), 1.3 (s, t-Bu-H), 1.1 (s, t-Bu-H), 0.7 (s, $CH_3$).

Analogues were synthesized by the said general procedure.

Example 36

A round-bottom flask of 100 ml was charged with a solution of catalyst A-1 (2 μmol), toluene 20 ml under 0.1 MPa of ethylene, stirred quickly, keep it at 50° C. for a period of time, mMAO(Al/Ti=1500) was added, stirred quickly for 0.5 h, quenching the reaction by 5 HCl/ethanol. The precipitated polymer was filtered and washed, dried at 50° C. under vacuum to constant weight, giving polyethylene 1.80 g. The activity is $1.8 \times 10^6$ g PE/molTi hr atm. and $M_w$=630,000 g/mol, polymer weight distribution is 2.13, $T_m$=136.1° C.

Example 37

A round-bottom flask of 100 ml was charged with a solution of catalyst A-1 (2 μmol), toluene 20 ml under 0.1 MPa of ethylene, stirred quickly, keep it 50° C. for a period of time, mMAO(Al/Ti=1500) was added, stirred quickly for 0.5 h, quenching the reaction by 5% HCl/ethanol. The precipitated polymer was filtered and washed, dried at 50° C. under vacuum to constant weight, giving polyethylene 1.22 g. The activity is $1.2 \times 10^6$ g PE/molTi hr atm. and $M_w$=700,000 g/mol, polymer weight distribution is 2.06, $T_m$=134.5° C., crystalline grade 78%.

Example 38

A round-bottom flask of 100 ml was charged with a solution of catalyst A-1 (2 μmol), toluene 20 ml under 0.1 MPa of ethylene, stirred quickly, keep it 50° C. for a period of time, mMAO(Al/Ti=1500) was added, stirred quickly for 0.5 h, quenching the reaction by 5% HCl/ethanol. The precipitated polymer was filtered and washed, dried at 50° C. under vacuum to constant weight, giving polyethylene 0.9422 g. The activity is $0.94 \times 10^6$ g PE/molTi hr atm. and $M_w$=720,000 g/mol, $T_m$=134.5° C., crystalline grade 80%.

Example 39

A 2 L autoclave was charged with a solution of toluene 600 ml and MAO (4.3 ml 15%) under ethylene atmosphere, stirred for 15 min at room temperature, added A-1 (23 μmol) in 10 ml of hexane, raising the pressure of the ethylene to $6 \times 10^5$ Pa under stirring quickly, the ethylene gas was removed after 1 h, the precipitated polymer was filtered and washed, dried at 50° C. under vacuum to constant weight, giving polyethylene 31.5 g. $M_w$=700,000 g/mol.

Example 40

A flask of 100 ml was charged with a solution of toluene 20 ml and $Et_3Al$ (Al/Cat=1000(mol)) under 0.1 MPa of ethylene atmosphere, stirred quickly, keep it in 40° C. for a period of time, catalyst A-1 (2 μmol) was added, 10 h later, quenching the reaction by 10% HCl/ethanol. The precipitated polymer was filtered and washed, dried at 50° C. under vacuum to constant weight, giving polyethylene 0.14 g.

Example 40

A flask of 100 ml was charged with a solution of methylbenzene 20 ml and mMAO (Al/Ti=1000) under 0.1 MPa of ethylene, stirred quickly, then put it in an 50° C. oil bath, keep the temperature for a period of time, catalyst F-1 (1.9 μmol) was added, after reacting for 1 h, quenching the reaction by 5% HCl/ethanol. The polymer was precipitated, filtered, washed, then dried at 50° C. under vacuum to constant weight, giving polyethylene 0.104 g. Catalytic activity is $5.5 \times 10^4$ g PE/molTi hr atm. The polymer molecular weight $M_w$=32,000 g/mol, the molecular distribution is 2.03.

Example 42

A flask of 100 ml was charged with a solution of toluene 20 ml and mMAO (Al/Ti=1000) under 0.1 MPa of ethylene, stirred quickly, then keep it at 50° C. for a period of time, catalyst B-1 (2.06 μmol) was added, after reacting for 0.5 h, quenching the reaction by 5% HCl/ethanol. The precipitated polymer was filtered, washed, then dried at 50° C. under vacuum to constant weight, giving polyethylene 0.52 g. Activity is $5.0 \times 10^5$ g PE/molTi hr atm. $M_w$=530,000 g/mol, the molecular distribution is 2.11.

Example 43

A flask of 100 ml was charged with toluene 20 ml and mMAO (Al/Ti=300) under 0.1 MPa of ethylene, stirred quickly, then keep it at 50° C. for a period of time, catalyst B-7 (1.6 μmol) was added, after reacting for 0.5 h, quenching the reaction by 5% HCl/ethanol. The precipitated polymer was filtered, washed, then dried at 50° C. under vacuum to constant weight, giving polyethylene 0.47 g. Activity is $5.9 \times 10^5$ g PE/molTi hr atm. $M_w$=670,000 g/mol, the molecular distribution is 2.47.

Example 44

A flask of 100 ml was charged with toluene 20 ml and mMAO (Al/Ti=300) under 0.1 MPa of ethylene, stirred quickly, then keep it at 50° C. for a period of time, catalyst A-7 (5.2 μmol) was added, after reacting for 0.5 h, quenching the reaction by 5% HCl/ethanol. The precipitated polymer was filtered, washed, then dried at 50° C. under vacuum to constant weight, giving polyethylene 0.77 g. Activity is $3.0 \times 10^5$ g PE/molTi hr atm. $M_w$=640,000 g/mol, the molecular distribution is 2.45.

Example 45

A flask of 100 ml was charged with toluene 20 ml and MMAO (Al/Cat=500 (mol)) under 0.1 MPa of ethylene, stirred quickly, then keep it at 40° C. for a period of time, catalyst A-9 (2 μmol) was added, after reacting for 3 min, quenching the reaction by 5% HCl/ethanol. The precipitated polymer was filtered, washed, then dried at 50° C. under vacuum to constant weight, giving polyethylene 0.55 g.

Example 46

A flask of 100 ml was charged with toluene 15 ml and MMAO (Al/Cat=500 (mol)) under 0.1 MPa of ethylene, stirred quickly, then keep it at 40° C. for a period of time, catalyst E-9 (3 µmol) in toluene was added, after reacting for 3 min, quenching the reaction by 5% HCl/ethanol. The precipitated polymer was filtered, washed, then dried at 50° C. under vacuum to constant weight, giving polyethylene 0.412 g.

Example 47

A flask of 100 ml was charged with toluene 15 ml and MMAO (Al/Cat=500 (mol)) under 0.1 MPa of ethylene, stirred quickly, then keep it at 40° C. for a period of time, catalyst B-9 (6 µmol) in toluene was added, after reacting for 1 h, quenching the reaction by 5% HCl/ethanol. The precipitated polymer was, filtered, washed, then dried at 50° C. under vacuum to constant weight, giving polyethylene 0.064 g.

Example 48

A flask of 100 ml was charged with toluene 15 ml and MMAO (Al/Cat=500 (mol)) under 0.1 MPa of ethylene, stirred quickly, then keep it at 40° C. for a period of time, catalyst A-9 (8 µmol ) in toluene was added, after reacting for 3 h, quenching the reaction by 5% HCl/ethanol. The precipitated polymer was filtered, washed, then dried at 50° C. under vacuum to constant weight, giving polyethylene 0.37 g.

Example 49

A f flask of 100 ml was charged with toluene 15 ml and MMAO (Al/Cat=500) under 0.1 MPa of ethylene, stirred quickly, then keep it at 40° C. for a period of time, catalyst A-4 (8 µmol) in toluene was added, after reacting for 0.5 h, quenching the reaction by 5% HCl/ethanol. The precipitated polymer was filtered, washed, then dried at 50° C. under vacuum to constant weight, giving polyethylene 0.91 g.

Example 50

A flask of 100 ml was charged with toluene 15 ml and MMAO (Al/Cat=500 (mol)) under 0.1 MPa of ethylene at room temperature, stirred quickly, then keep it at 50° C. for a period of time, catalyst A-2 (9 µmol) was added, after reacting for 3 h, quenching the reaction by 5% HCl/ethanol. The precipitated polymer was filtered, washed, then dried at 50° C. under vacuum to constant weight, giving polyethylene 0.45 g.

Example 51

A flask of 100 ml was charged with toluene 10 ml and MMAO (Al/Cat=500) under 0.1 MPa of ethylene, stirred quickly, then keep it at 50° C. for a period of time, catalyst A-13 (30 µmol ) was added, after reacting for 20 min, quenching the reaction by 5% HCl/ethanol. The precipitated polymer was filtered, washed, then dried at 50° C. under vacuum to constant weight, giving polyethylene 0.70 g.

Example 52

A flask of 100 ml was charged with toluene 10 ml and MMAO (Al/Cat=500) under 0.1 MPa of ethylene, stirred quickly, then keep it at 50° C. for a period of time, catalyst A-2 (3 µmol) was added, after reacting for 1 h, quenching the reaction by 5% HCl/ethanol. The precipitated polymer was filtered, washed, then dried at 50° C. under vacuum to constant weight, giving polyethylene 0.34 g.

Example 53

A flask of 100 ml was charged with toluene 10 ml and MMAO (Al/Cat=500) under 0.1 MPa of ethylene, stirred quickly, then keep it at 50° C. for a period of time, catalyst B-2 (5 µmol) was added, after reacting for 1 h, quenching the reaction by 5% HCl/ethanol. The precipitated polymer was filtered, washed, then dried at 50° C. under vacuum to constant weight, giving polyethylene 0.4 g.

Example 54

A flask of 100 ml was charged with toluene 10 ml and MMAO (Al/Cat=500) under 0.1 MPa of ethylene, stirred quickly, then keep it at 40° C. for a period of time, catalyst A4 (10.5 µmol) in toluene was added, after reacting for 73 min, quenching the reaction by 5% HCl/ethanol. The precipitated polymer was filtered, washed, then dried at 50° C. under vacuum to constant weight, giving polyethylene 1.37 g. The content of hexene is 11%.

Example 55

A flask of 100 ml was charged with toluene 20 ml and mMAO (Al/Ti=1000) under 0.1 MPa of ethylene, stirred quickly, keep it at 0° C. for a period of time, catalyst C-1 (13 µmol) was added, after reacting for 1 h, quenching the reaction by 5% HCl/ethanol. The precipitated polymer was filtered, washed, dried at 50° C. under vacuum to constant weight, giving polyethylene 0.0051 g. Activity is $3.9 \times 10^2$ g PE/molTi hr atm. $M_w$=21,000 g/mol, polymer weight distribution is 2.21.

Example 56

A flask of 100 ml was charged with toluene 20 ml and MMAO (Al/Cat=1000) under 0.1 MPa of ethylene, stirred quickly, catalyst C-8 (16 µmol) was added at room temperature, after reacting for 1 h, quenching the reaction by 5% HCl/ethanol. The precipitated polymer was filtered, washed, dried at 50 under vacuum to constant weight, giving ethylene oligomer 0.7 g.

Example 57

A flask of 100 ml was charged with toluene 20 ml and MMAO (Al/Cat=1000) under 0.1 MPa of ethylene at room temperature, stirred quickly, catalyst C-18 (22 µmol) was added, after reacting for 3 h, quenching the reaction by 5% HCl/ethanol. The precipitated polymer was filtered, washed, then dried at 50° C. under vacuum to constant weight, giving polymer 0.003 g.

Example 58

A flask of 100 ml was charged with toluene 20 ml and MMAO (Al/Cat=I000) under 0.1 MPa of ethylene at room temperature, stirred quickly, catalyst C-16 (15 μmol) was added, after reacting for 3 h, quenching the reaction by 5% HCl/ethanol. The precipitated polymer was filtered, washed, then dried at 50° C. under vacuum to constant weight, giving polymer 0.005 g.

Example 59

A ampulla of 15 ml was charged with a solution of catalyst A-1 (16 μmol, 7.2×10$^{-3}$M in toluene) and AlEt$_3$ (Al/Ti=20), stirred quickly, keep it at 50° C. for a period of time, 1 ml of hexene was added, after reacting for 1 h, quenching the reaction by 5% HCl/ethanol. The precipitated polymer was filtered, washed, dried at 50° C. under vacuum to constant weight, giving polyethylene 0.12 g. Activity is 0.75×10$^4$ g PE/molTi hr atm. M$_w$=18,000 g/mol.

Example 60

A Ampulla of 15 ml was charged with a solution of catalyst A-1 (18 μmol, 7.2×10$^{-3}$M in toluene) and AlEt$_3$ (Al/Ti=20), stirred quickly, keep it in 50° C. for a period of time, 1 ml of methyl methylacrylate was added, after reacting for 12 h, quenching the reaction by 5% HCl/ethanol. The precipitated polymer was filtered, washed, dried at 50° C. under vacuum to constant weight, giving polymethylmethacrylate 0.1721 g. Activity is 0.96×10$^4$ g PE/molTi hr atm. M$_w$=220,000 g/mol. molecular weight distribution is 2.1.

Example 61

A 2 L autoclave was charged with toluene 400 ml and MAO (6 ml, 15%) under nitrogen, stirred for 15 min at room temperature, added 10 ml of catalyst A-1 (29 μmol) in toluene, stirring quickly, propene was added. The pressure of the system was remained 18×10$^5$ Pa, after reacting for 0.5 h, the propene gas was vented, the polymer was precipitated, filtered, washed, dried at 50° C. under vacuum to constant weight, giving polypropene 5.3 g.

Example 62

A flask of 100 ml was charged with a solution of 1-hexene 0.5 ml, toluene 5 ml and MMAO (Al/Cat=500) under 0.1 MPa of ethylene, stirred quickly, then keep it at 40° C. for a period of time, catalyst A-1 (9 μmol) was added, then toluene 9.5 ml was added (the whole valume was 15 ml), after reacting for 10 min, quenching the reaction by 5% HCl/ethanol. The precipitated polymer was filtered, washed, then dried at 50° C. under vacuum to constant weight, giving polymer 1.49 g. The content of hexene is 5%.

Example 63

A flask of 100 ml was charged with 1-hexene 10 ml and MMAO (Al/Cat=500) under 0.1 MPa of ethylene, stirred quickly, then keep it at 40° C. for a period of time, catalyst A-1 (9 μmol) was added, then toluene was added to the whole volume is 15 ml, after reacting for 10 min, quenching the reaction by 5% HCl/ethanol. The precipitated polymer was filtered, washed, then dried at 50° C. under vacuum to constant weight, giving polymer 2.9 g. The content of hexene is 30%.

Example 64

A flask of 100 ml was charged with a solution of norbornene 2 ml in toluene (norbornene wt %=67%), toluene 15 ml and MMAO (Al/Cat=500) under 0.1 MPa of ethylene, stirred quickly, then keep it at 40° C. for a period of time, catalyst A-1 (9 μmol) was added, after reacting for 20 min, quenching the reaction by 5% HCl/ethanol. The precipitated polymer was filtered, washed, then dried at 50° C. under vacuum to constant weight, giving polymer 0.89 g. The content of norbornene is 15%.

Example 65

A flask of 100 ml was charged with a solution of norbornene in toluene 25 ml (norbornene wt %=67%), toluene 15 ml and MMAO (Al/Cat=500) under 0.1 MPa of ethylene, stirred quickly, then keep it at 40° C. for a period of time, catalyst A-1 (9 μmol) was added, after reacting for 20 min, quenching the reaction by 5% HCl/ethanol. The precipitated polymer was filtered, washed, then dried at 50° C. under vacuum to constant weight, giving polymer 0.42 g. The content of norbornene is 40%.

Example 66

A flask of 25 ml was charged with a solution of hexene 2 ml, 15 ml toluene and MMAO (Al/Cat=200) under 0.1 MPa of nitrogen, stirred quickly, then keep it at 50° C. for a period of time, catalyst A-1 (18 μmol) was added, after reacting for 1 h, quenching the reaction by 5% HCl/ethanol. Treated as general method give polymer 0.32 g.

Example 67

A flask of 25 ml was charged with a solution of norbornene in toluene 2 ml (norbornene w %=67%), toluene and MMAO (Al/Cat=500) under 0.1 MPa of nitrogen, stirred quickly, then keep it at 50° C. for a period of time, catalyst A-1 (15 μmol) was added, after reacting for 1 h, quenching the reaction. Treated as general method give polymer 0.052 g.

Example 68

A flask of 20 ml was charged with a solution of methyl methacrylate 1 ml, toluene and MMAO (Al/Cat=20 (mol)) under 0.1 MPa of nitrogen, stirred quickly, then keep it at 50° C. for a period of time, catalyst A-1 (18 μmol) was added, after reacting for 12 h, quenching the reaction. Treated as general method give polymer of 0.18 g.

Example 69

A flask of 100 ml was charged with a solution of norbornene in toluene 2 ml (norbornene wt %=67%), toluene 5 ml and MMAO (Al/Cat=500) under 0.1 MPa of nitrogen, stirred quickly, then keep it at 40° C. for a period of time, catalyst A-9 (12 μmol) was added, after 10 min, quenching the reaction. Treated as general method give polymer 0.72 g, the content of norbornene is 21%.

Example 70

A Schlenk flask of 100 ml was charged with a solution of 1-hexene 2 ml, toluene 5 ml, and MMAO (Al/cat=500) under 0.1 MPa of ethylene, stirred quickly, keep it at 40° C.

for a period of time, catalyst A-9 (9 µmol) was added, 20 min later, quenching the reaction by 10% HCl/ethanol. The precipitated polymer was filtrating, washing, dried at 50° C. under vacuum to constant weight, yield 1.51 g and the content of hexene is 22%.

Example 71

A Schlenk flask of 100 ml was charged with a solution of 1-hexene 2 ml, toluene 5 ml, and MMAO (Al/cat=500) under 0.1 MPa of ethylene atmosphere, stirred quickly, keep it at 40° C. for a period of time, catalyst E-9 (4.5 µmol) was added, 15 min later, quenching the reaction by 5% HCl/ethanol. The precipitated polymer was filtrated, washed, dried at 50° C. under vacuum to constant weight, yield 0.85 g and the content of hexene is 4.5%.

Example 72

A Schlenk flask of 100 ml was charged with a solution of 1-hexene 2 ml, toluene 5 ml, and MMAO (Al/cat=500) under 0.1 MPa of ethylene atmosphere, stirred quickly, keep it at 40° C. for a period of time, catalyst E-9 (4.5 µmol) was added, 15 min later, quenching the reaction by 5% HCl/ethanol. The precipitated polymer was filtrating, washing, dried at 50° C. under vacuum to constant weight, yield 0.85 g and the content of hexene is 4.5%.

Example 73

A flask of 100 ml was charged with a solution of trialkylated compound of catalyst A-1 (2 µmol), toluene 20 ml, under 0.1 MPa of ethylene atmosphere, stirred quickly, keep it at 40° C. for a period of time, mMAO (Al/Ti=500) was added, 0.5 h later, quenching the reaction by 5% HCl/ethanol. The precipitated polymer was filtered, washed and dried at 50° C. under vacuum to constant weight, give polyethylene 0.24 g.

Example 74

A flask was charged with treated $SiO_2$ (160 $m^2g^{-1}$, 60 Å, 63-200 µm) 500 mg and solution of complex A-1 (200 mg) in 30 ml of toluene in turn, heated to 100° C., stirred overnight. Filtered, the solid was washed with 20 ml of toluene for several times, dried under vacuum for 10 h, thus obtained the supported catalyst.

A flask of 100 ml was charged with the supported catalyst (2 µmol) and toluene 20 ml under 0.1 MPa of ethylene, stirred quickly, keep it at 50° C. for a period of time, mMAO(Al/Ti=500) was added, 0.5 h later, quenching the reaction by 5% HCl/ethanol. The precipitated polymer was filtered, washed, dried at 50° C. under vacuum to constant weight, give polyethylene 2.6 g.

The invention claimed is:

1. A catalytic system for olefin polymerization or copolymerization comprising a catalyst having the following formula:

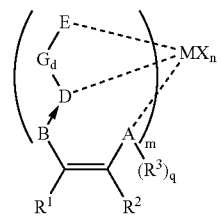

wherein:
A, B, D, E, G, and connecting bonds comprise a tridentate ligand; and wherein
  A represents a metal-coordinating moiety selected from the group consisting of an oxygen atom-containing moiety, a sulfur atom-containing moiety, a selenium atom-containing moiety, a nitrogen atom-containing moiety, and a phosphorus atom-containing moiety;
  B represents a chemically inert moiety selected from the group consisting of a nitrogen atom-containing moiety, a phosphorus atom-containing moiety, and a substituted or unsubstituted hydrocarbyl moiety;
  D represents O, S, Se, or a metal-coordinating moiety selected from the group consisting of an oxygen atom-containing moiety, a nitrogen atom-containing moiety, a sulfur atom-containing moiety, and a selenium atom-containing moiety;
  E represents a metal-coordinating moiety selected from the group consisting of an oxygen atom-containing moiety, a sulfur atom-containing moiety, a selenium atom-containing moiety, a nitrogen atom-containing moiety, and a phosphorus atom-containing moiety;
  G represents a chemically inert substituted or unsubstituted phenylene group bridging D and E through

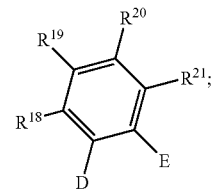

$R^1$, $R^2$, and $R^3$ each individually represents hydrogen or a chemically inert substituted or unsubstituted hydrocarbyl moiety, $R^1$ and $R^2$ being optionally linked to form a ring;
  $R^{18}$, $R^{19}$, $R^{20}$, $R^{21}$, each independently represents hydrogen, halogen, a chemically inert substituted or unsubstituted hydrocarbyl moiety;
  M represents a transition metal selected from Group III to Group XI, M being linked to each of A, D, and E by a covalent or a coordinate covalent bond;
  X represents a weakly coordinating monovalent ligand;
  d is 1;
  q is 0 or 1;
  m is 1, 2 or 3; and
  n is 1, 2, 3 or 4 as needed to balance the charge on M.

2. The catalytic system as recited in claim 1, wherein A is selected from the group consisting of O, S, sulfinyl, sulfonyl, Se,

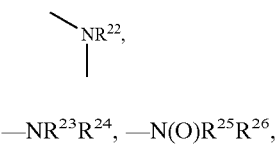

—NR$^{23}$R$^{24}$, —N(O)R$^{25}$R$^{26}$,

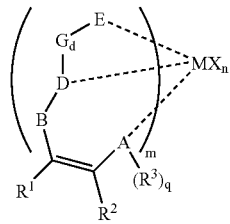

—PR$^{28}$R$^{29}$, —P(O)R$^{30}$R$^{31}$, and —Se(O)R$^{39}$, wherein R$^{22}$, R$^{23}$, R$^{24}$, R$^{25}$, R$^{26}$, R$^{27}$, R$^{28}$, R$^{29}$, R$^{30}$, R$^{31}$, and R$^{39}$ each individually hydrogen, halogen, or a substituted or unsubstituted hydrocarbyl group.

3. A catalytic system for olefin polymerization or copolymerization comprising a catalyst having the following formula:

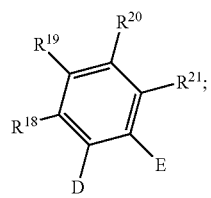

wherein:
A, B, D, E, G, and connecting bonds comprise a tridentate ligand; and wherein
A represents a metal-coordinating moiety selected from the group consisting of an oxygen atom-containing moiety, a sulfur atom-containing moiety, a selenium atom-containing moiety, a nitrogen atom-containing moiety, and a phosphorus atom-containing moiety;
B represents a chemically inert moiety selected from the group consisting of a nitrogen atom-containing moiety and a substituted or unsubstituted hydrocarbyl moiety;
D is a nitrogen atom or NR$^5$;
E represents a metal-coordinating moiety selected from the group consisting of an oxygen atom-containing moiety, a sulfur atom-containing moiety, a selenium atom-containing moiety, a nitrogen atom-containing moiety, and a phosphorus atom-containing moiety;
G represents a chemically inert substituted or unsubstituted phenylene group bridging D and E through

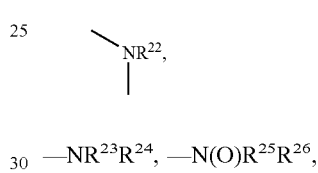

R$^1$, R$^2$, and R$^3$ each individually represents hydrogen or a chemically inert substituted or unsubstituted hydrocarbyl moiety, R$^1$ and R$^2$ being optionally linked to form a ring;

R$^5$ represents a lone pair of nitrogen atom electrons, hydrogen, hydrocarbyl of C$_1$-C$_{30}$, substituted hydrocarbyl of C$_1$-C$_{30}$, or a metal-coordinating moiety containing an oxygen atom, a nitrogen atom, a sulfur atom, a selenium atom, or a phosphorus atom;

R$^{18}$, R$^{19}$, R$^{20}$, R$^{21}$, each independently represents hydrogen, halogen, a chemically inert substituted or unsubstituted hydrocarbyl moiety;

M represents a transition metal selected from Group IV, M being linked to each of A, D, and E by a covalent or a coordinate covalent bond;

X represents a weakly coordinating monovalent ligand;

d is 1;

q is 0 or 1;

m is 1; and n is 2, 3 or 4 as needed to balance the charge on M.

4. The catalytic system as recited in claim 1, wherein E is selected from the group consisting of O, S, sulfinyl, sulfonyl, Se,

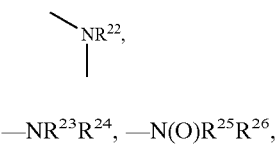

—NR$^{23}$R$^{24}$, —N(O)R$^{25}$R$^{26}$,

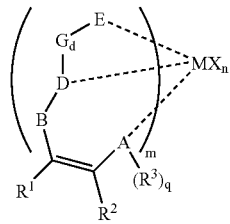

—PR$^{28}$R$^{29}$, —P(O)R$^{30}$R$^{31}$, and —Se(O)R$^{39}$, wherein R$^{22}$, R$^{23}$, R$^{24}$, R$^{25}$, R$^{26}$, R$^{27}$, R$^{28}$, R$^{29}$, R$^{30}$, R$^{31}$, and R$^{39}$ each individually hydrogen, halogen, or a substituted or unsubstituted hydrocarbyl group.

5. The catalytic system as recited in claim 1, wherein B is a chemically inert substituted or unsubstituted hydrocarbyl moiety.

6. The catalytic system as recited in claim 1, wherein M is selected from the group consisting of Ti (IV), Zr (IV), Hf (IV), Cr (III), Fe (III), Fe (II), Ni (II), Pd (II), and Co(II).

7. The catalytic system as recited in claim 6, wherein M is Ti (IV) or Zr (IV).

8. The catalytic system as recited in claim 1, wherein X is selected from the group consisting of F, Cl, Br, I, nitrogen atom-containing moiety, boron atom-containing moiety, oxygen atom-containing moiety.

9. The catalytic system as recited in claim 1, wherein the catalyst has the following formula:

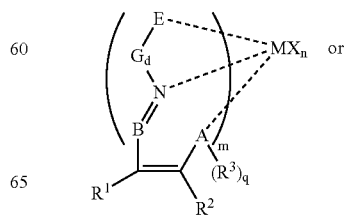

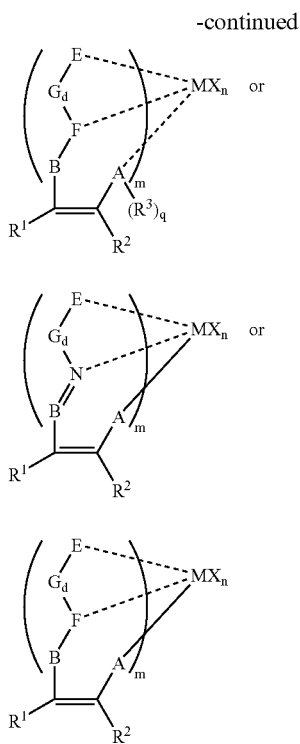

wherein

F represents a metal-coordinating moiety selected from the group consisting of an oxygen atom-containing moiety, a sulfur atom-containing moiety, a selenium atom-containing moiety.

10. The catalytic system as recited in claim 9, wherein the catalyst has the following formula:

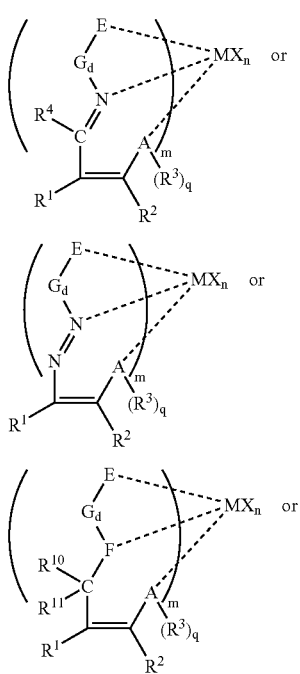

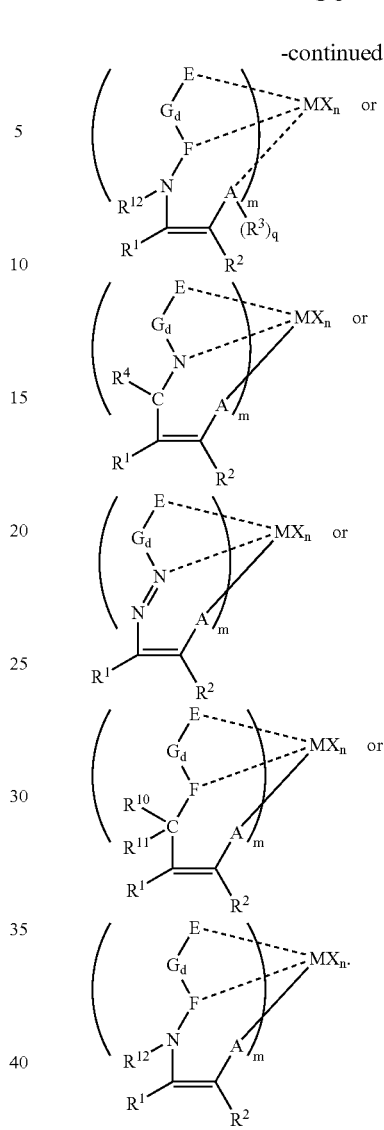

wherein:

$R^4$, $R^{10}$, and $R^{11}$ each individually represents hydrogen or a chemically inert substituted or unsubstituted hydrocarbyl moiety, $R^{10}$ and $R^{11}$ being optionally linked to form a ring; and $R^{12}$ represents hydrogen or a chemically inert substituted or unsubstituted hydrocarbyl moiety.

11. The catalytic system as recited in claim 9, wherein the catalyst has the following formula:

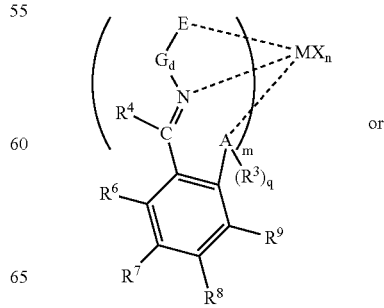

-continued

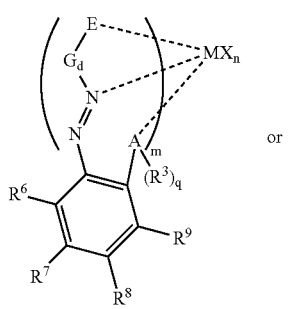

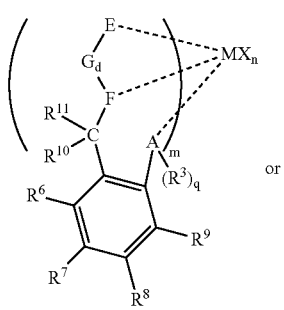

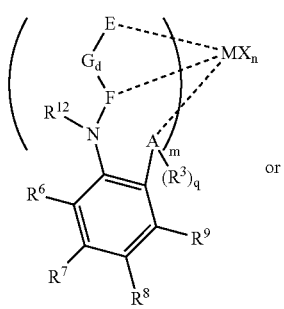

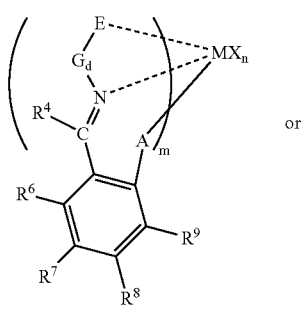

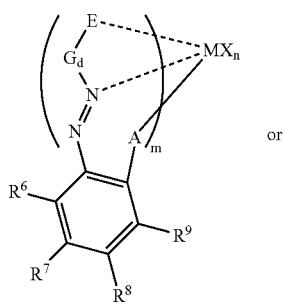

-continued

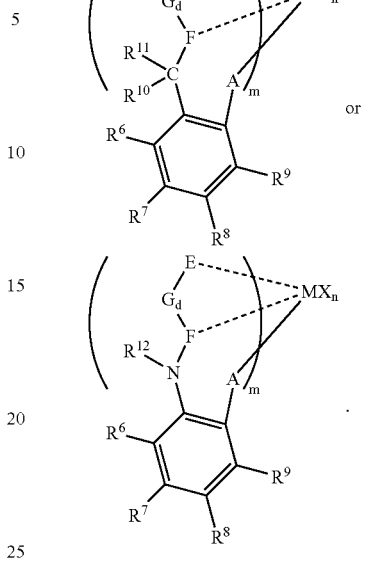

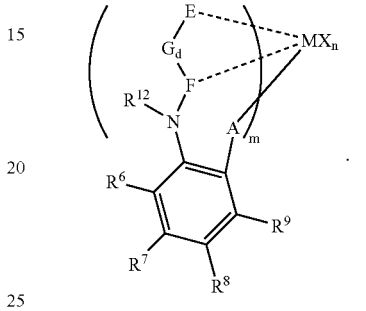

wherein:
$R^6$, $R^7$, $R^8$, $R^9$ each independently hydrogen, halogen, a chemically inert substituted or unsubstituted hydrocarbyl moiety, or a chemically inert functional group; any two adjacent $R^6$, $R^7$, $R^8$, and $R^9$ moieties being optionally linked to form a ring.

12. A catalytic system for olefin polymerization or copolymerization comprising a catalyst having the following formula:

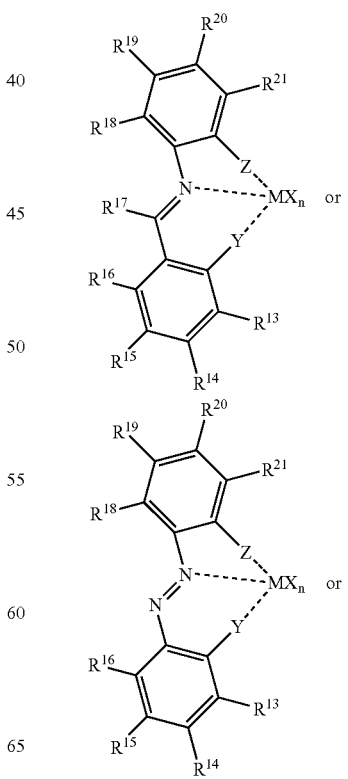

-continued

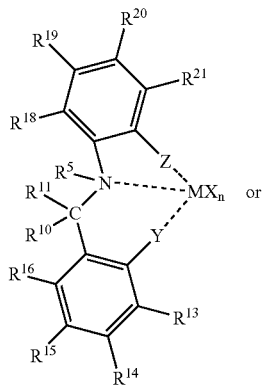

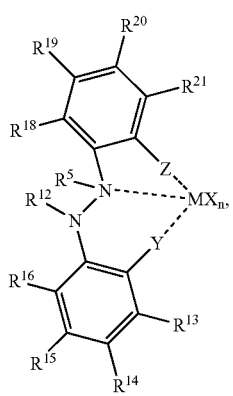

wherein:

R[10], R[11], R[12], and R[17] each individually represents hydrogen, halogen substituted hydrocarbyl moiety, or a chemically inert function group, R[10] and R[11] being optionally linked to form a ring;

R[13], R[14], R[15], R[16], R[18], R[19], R[20], R[21] each independently represents hydrogen, halogen, a chemically inert substituted or unsubstituted hydrocarbyl moiety, or a chemically inert functional group; any two adjacent R[13], R[14], R[15], R[16], R[18], R[19], R[20], R[21] moieties being optionally linked to form a ring;

R[5] represents a lone pair of nitrogen atom electrons, hydrogen, hydrocarbyl of $C_1$-$C_{30}$, substituted hydrocarbyl of $C_1$-$C_{30}$, or a metal-coordinating moiety containing an oxygen atom, a nitrogen atom, a sulfur atom, a selenium atom, or a phosphorus atom; and Y and Z each independently represents a metal-coordinating moiety selected from the group consisting of an oxygen atom-containing moiety, a sulfur atom-containing moiety, a selenium atom-containing moiety, a nitrogen atom-containing moiety, and a phosphorus atom-containing moiety.

13. The catalytic system as recited in claim 1, wherein said tridentate ligand is selected from the group consisting of

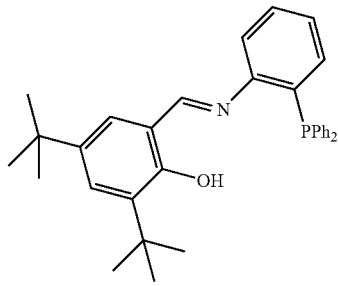
L1

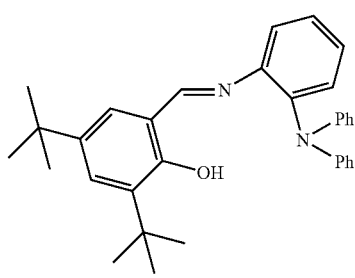
L2

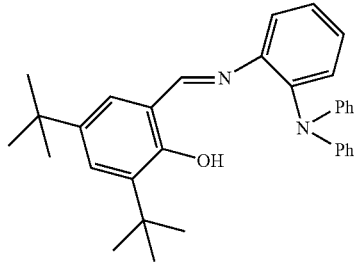
L3

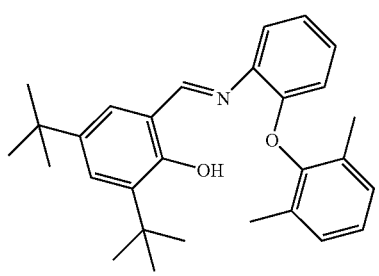
L4

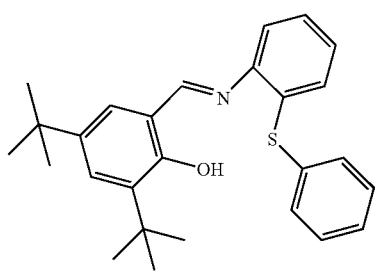
L5

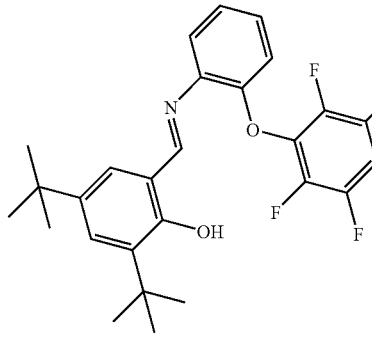
L8

-continued
L9
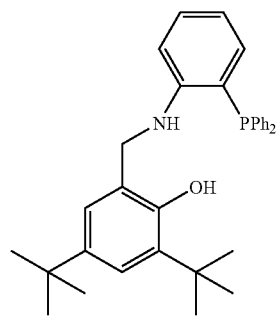
L10
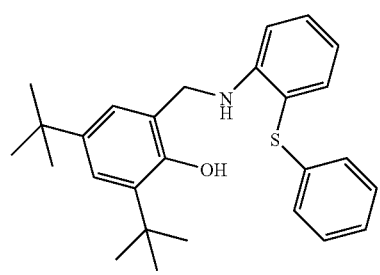
L12
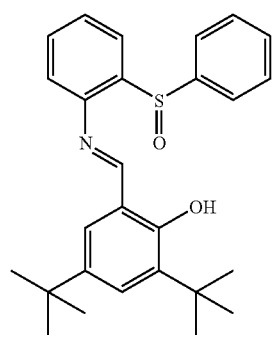
L13
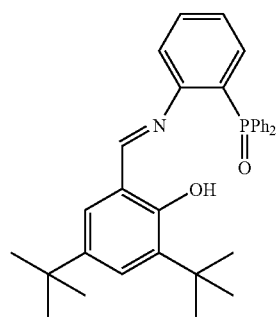
L14
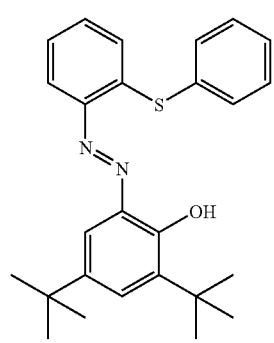
-continued
L15
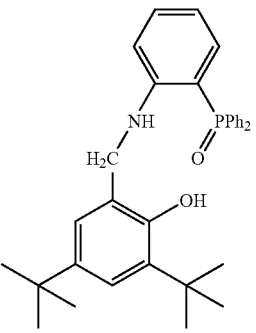
L16
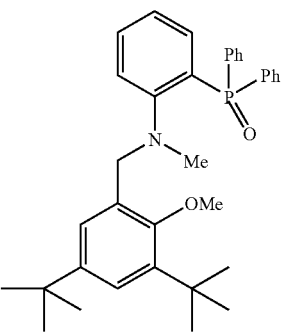
L18
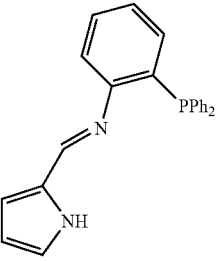
L19
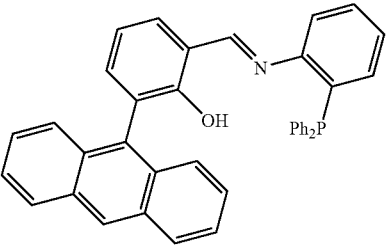
L20
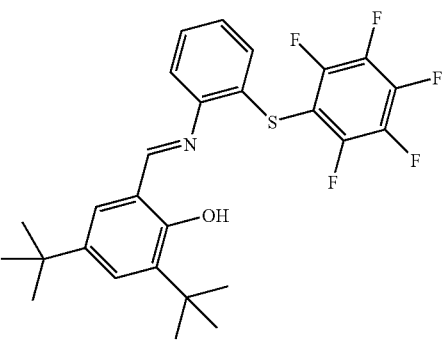

-continued
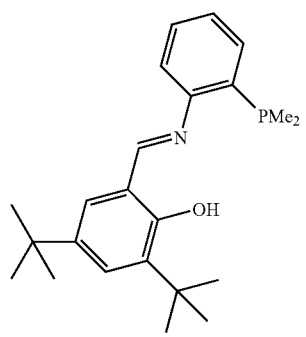
L28
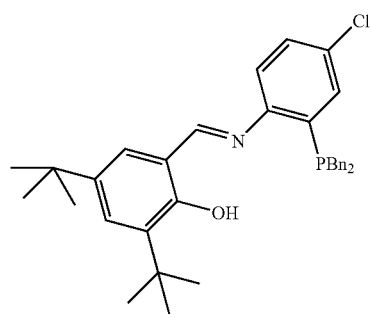
L29
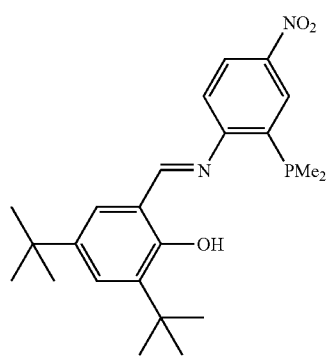
L30
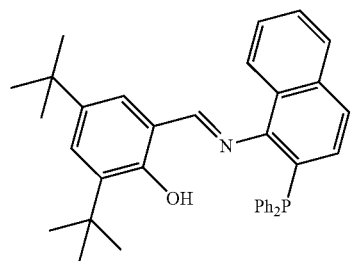
L31
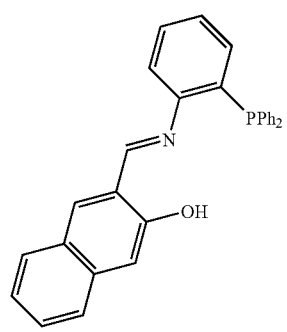
L32
-continued
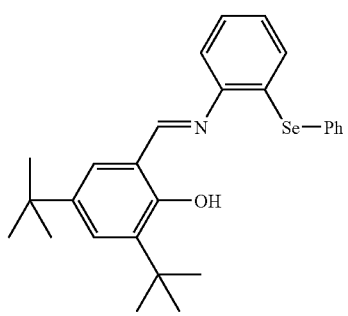
L33
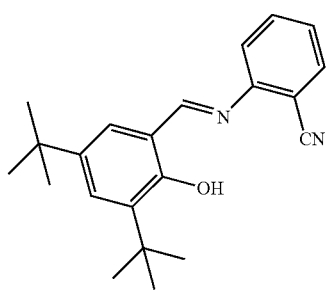
L34
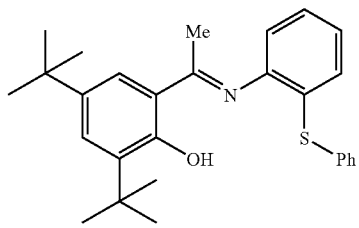
L35
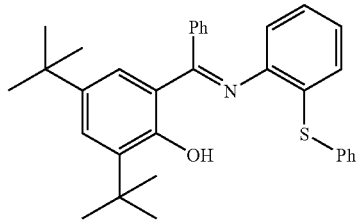
L36
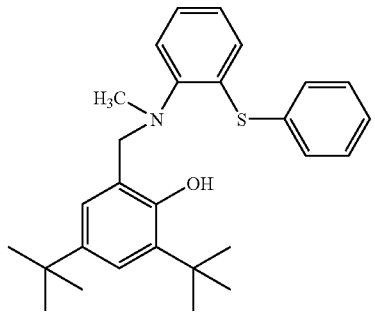
L21

-continued
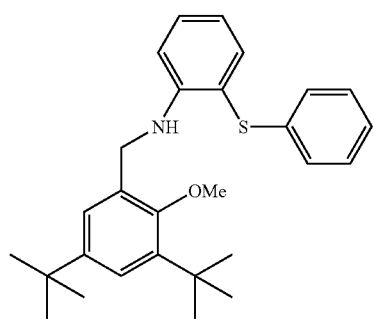
L22
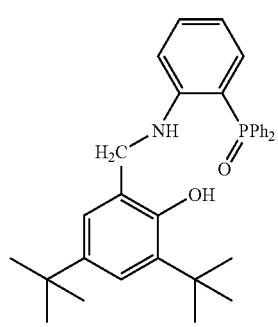
L23
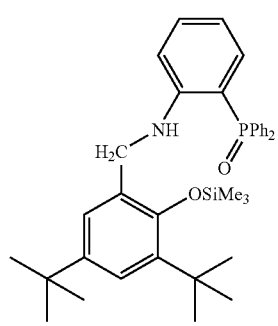
L24
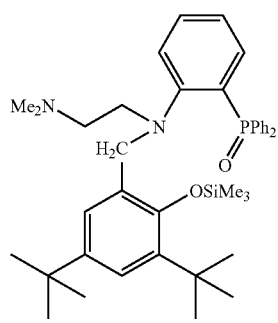
L25
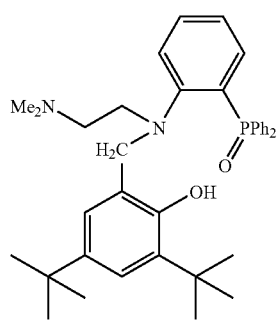
L26
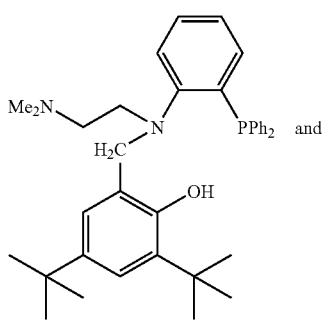
L27
and
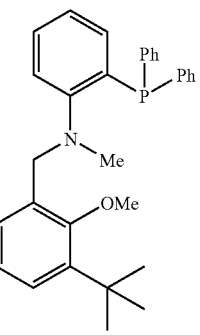
L17
14. The catalytic system as recited in claim 13, wherein said tridentate ligand is prepared from a ligand that is
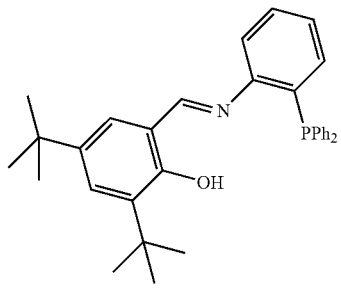
L1
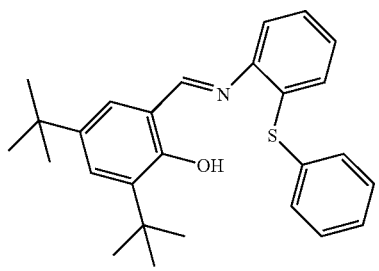
L4

-continued
L9
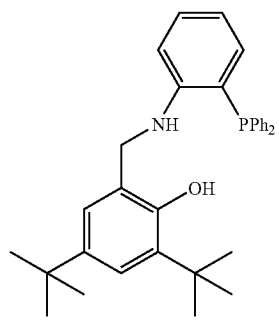
L20
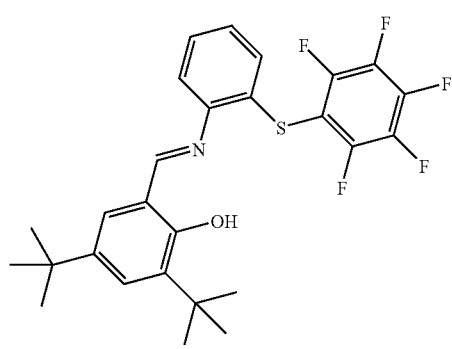
L35
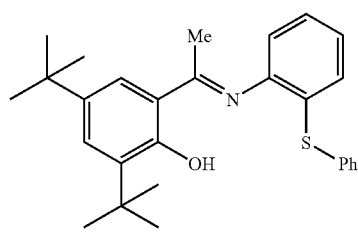
L36
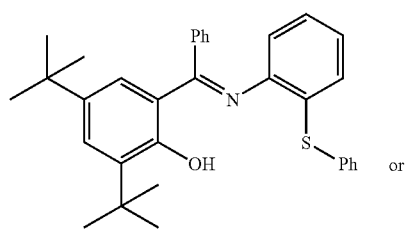
L33
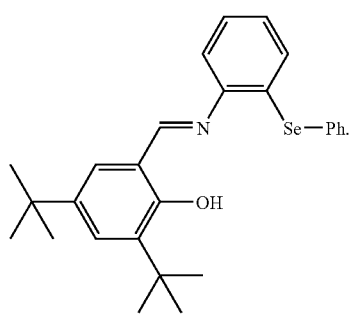
15. The catalytic system as recited in claim 1, wherein said catalyst is selected from the group consisting of
A-1
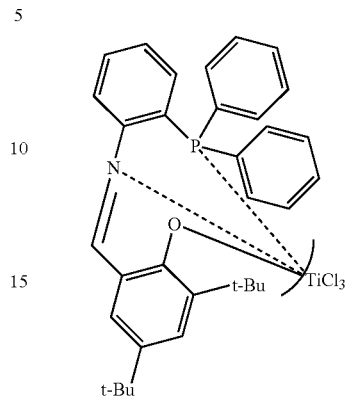
A-2
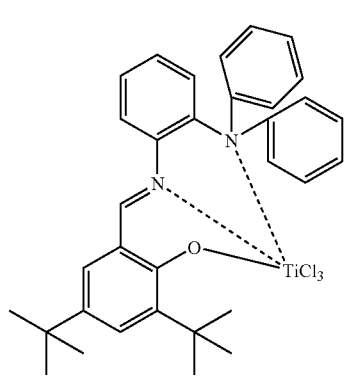
B-1
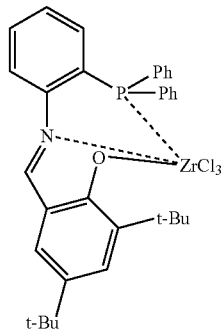
B-2
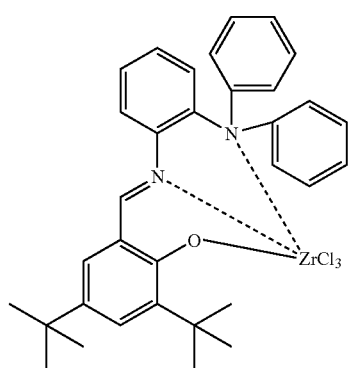

-continued
A-3
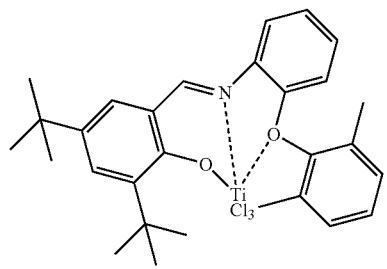
A-4
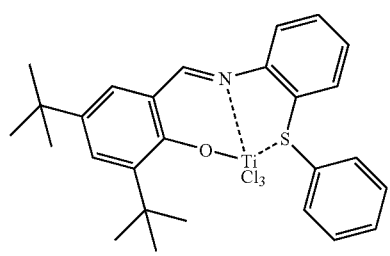
A-5
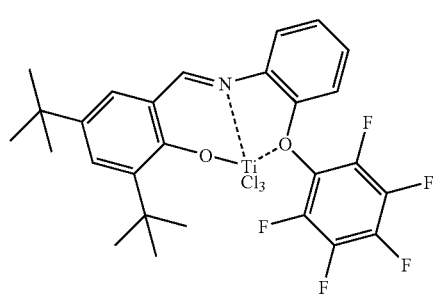
A-6
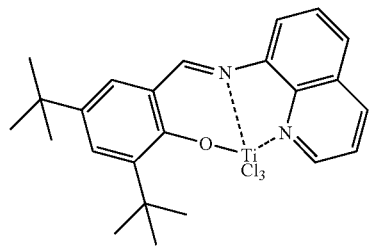
A-7
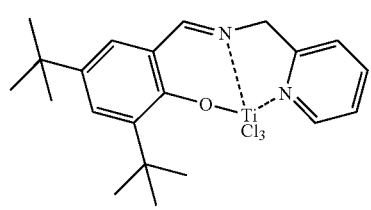
A-9
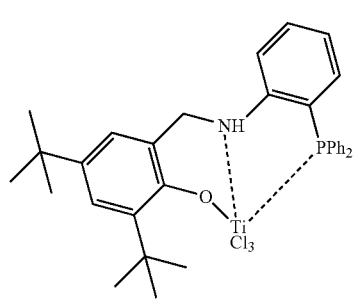
-continued
A-13
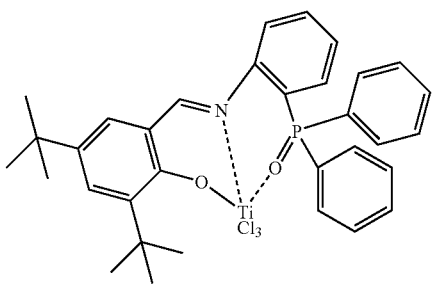
A-14
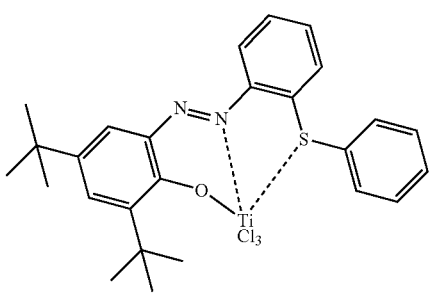
A-18
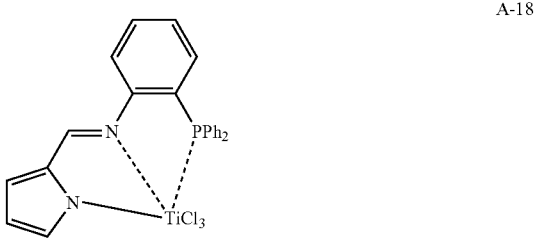
A-19
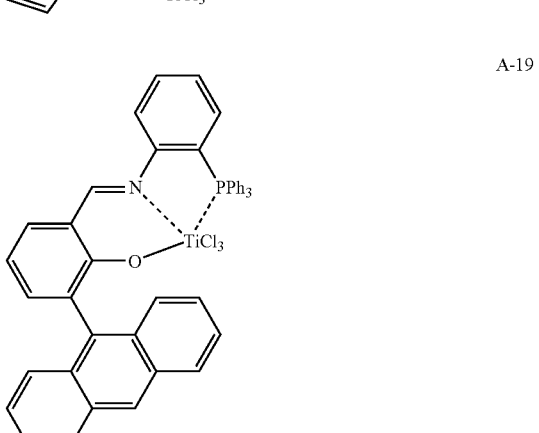
A-20
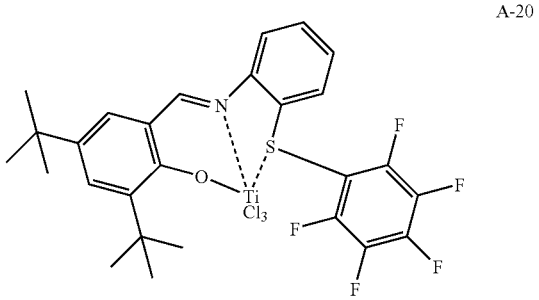

-continued
A-21
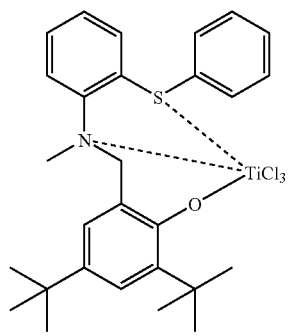
A-28
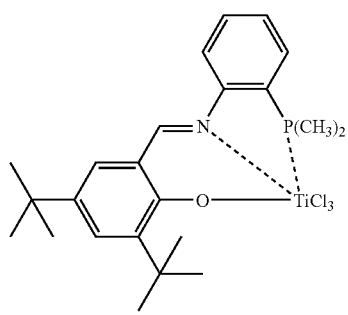
A-29
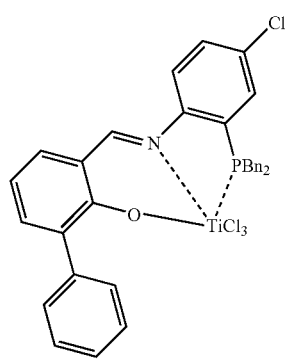
A-30
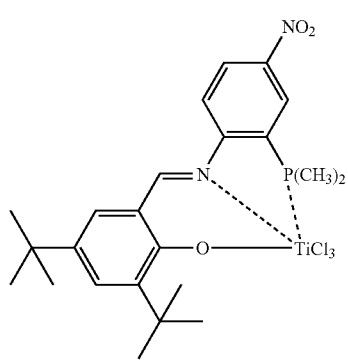
-continued
A-31
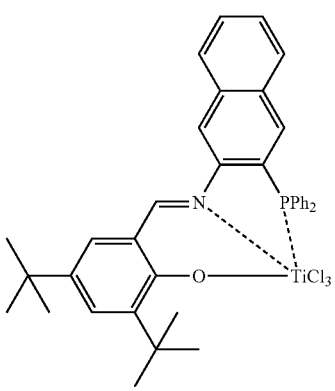
A-32
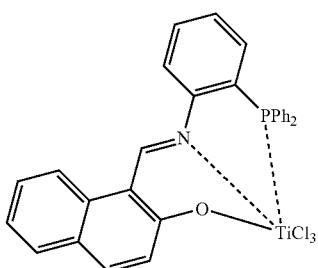
A-33
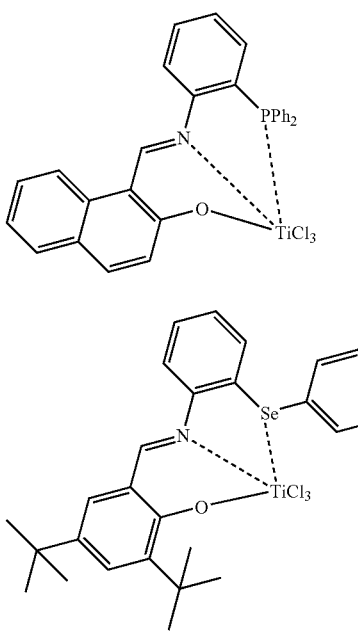
A-34
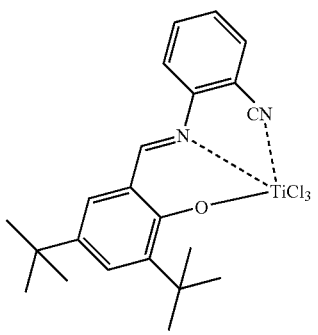
A-35
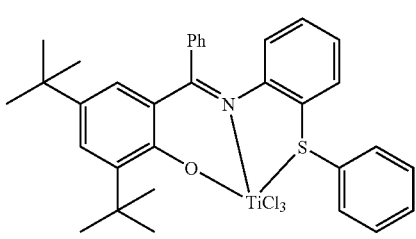

-continued
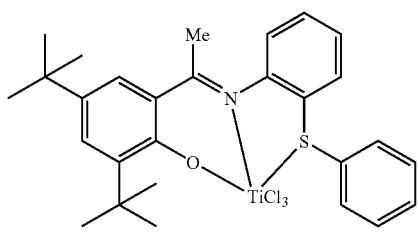
A-36
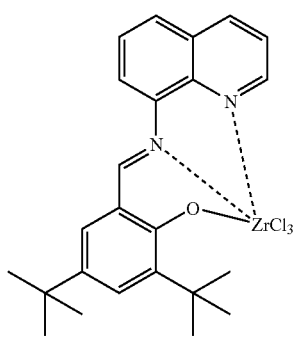
B-6
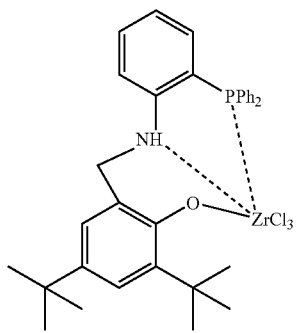
B-9
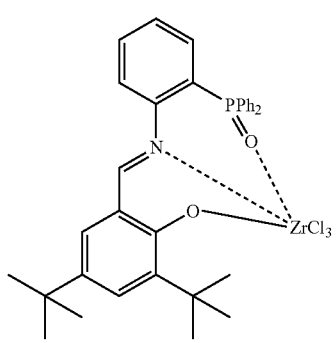
B-13
-continued
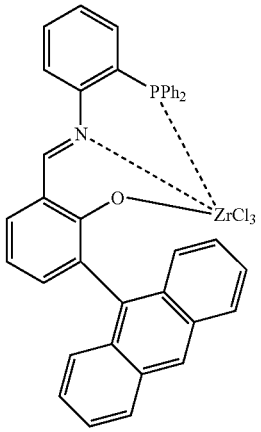
B-19
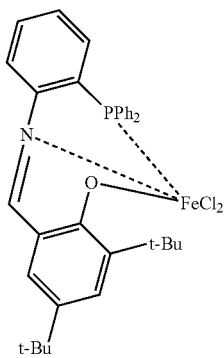
C-1
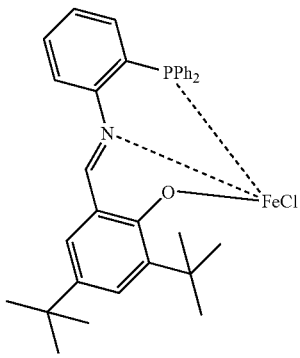
D-1
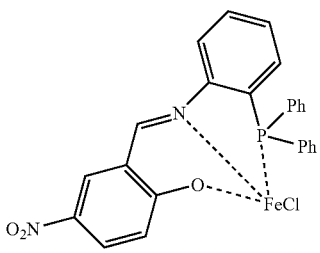
D-8

-continued
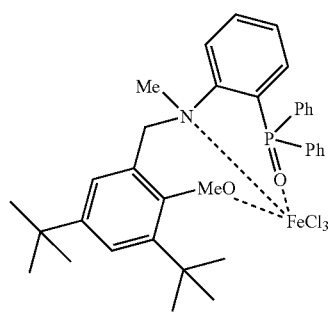
D-16
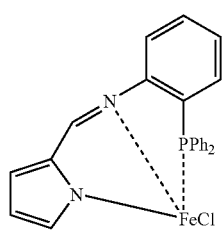
D-18
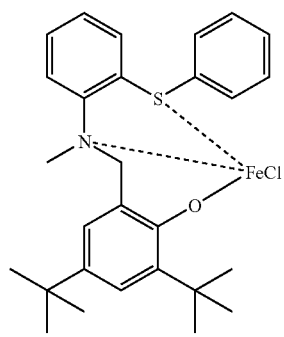
D-21
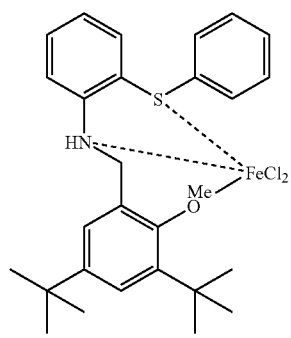
D-22
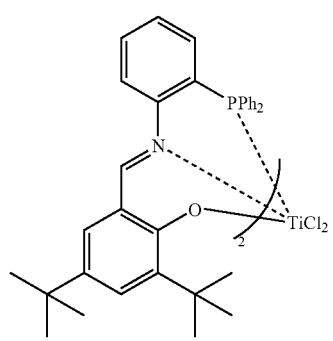
F-1
-continued
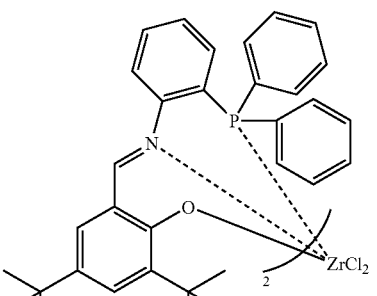
G-1
and
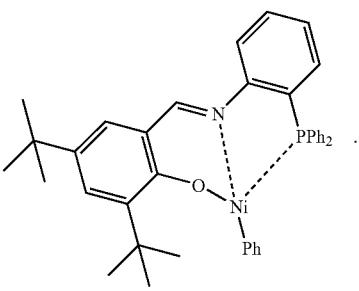
H-1
16. The catalytic system as recited in claim 15, wherein said catalyst is
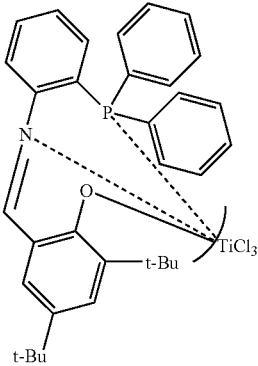
A-1
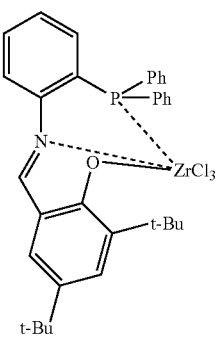
B-1

-continued

A-4
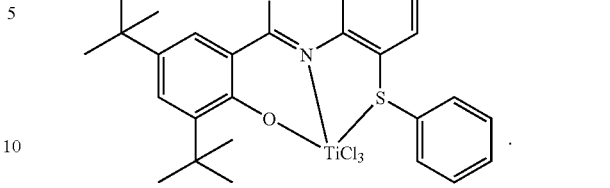

A-9
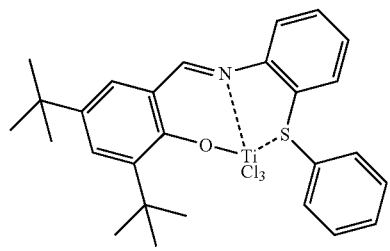

A-20
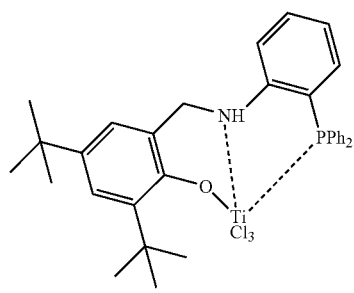

A-33
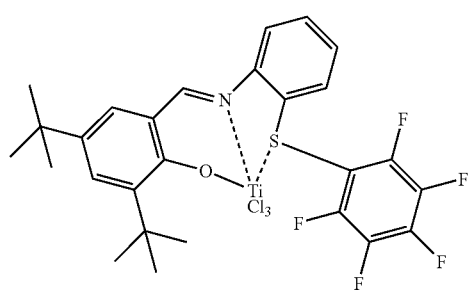

A-35
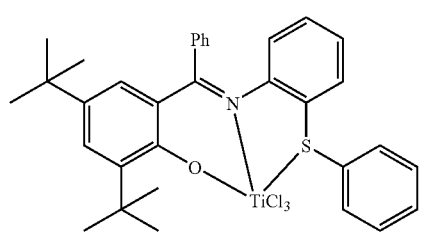

-continued

A-36

17. The catalytic system as recited in claim 1, wherein the catalyst is a homogeneous catalyst or a heterogeneous catalyst.

18. The catalytic system as recited in claim 1, further comprising a solid support.

19. The catalytic system as recited in claim 18, wherein said solid support is an organic polymeric material or an inorganic material.

20. The catalytic system as recited in claim 19, wherein said solid support is an inorganic material selected from the group consisting of silica, alumina, titania, magnesium chloride, and mixtures thereof.

21. The catalytic system as recited in claim 17, further comprising a co-catalyst.

22. The catalytic system as recited in claim 21, wherein said co-catalyst is a methyl aluminoxane (MAO), a modified methyl aluminozane (MAO), an alkyl aluminum compound, boron alkyl, or a metal salt of $BF_4^-$, $(C_6F_5)_4B^-$, or $(R_{40}BAr_3)^-$.

23. A process for polymerizing an olefin or a mixture of olefins or copolymerization in the presence of the catalytic system as recited in claim 21.

24. The process as recited in claim 23, wherein said process is carried out at a pressure of 0.1 Mpa to 10 Mpa and a temperature of −50° C. to 150° C.

25. The process as recited in claim 23, wherein said process is carried out at a catalyst:co-catalyst mole ratio of 1:1 to 1:5000.

26. The process as recited in claim 25, wherein said process is carried out at a catalyst:co-catalyst mole ratio of 1:10 to 1:2000.

27. The process as recited in claim 23, wherein said olefin or mixture of olefins is selected from the group consisting of ethylene, alkenes and functionalized alkenes containing 3 to 30 carbons, cycloalkenes, norbornene and derivatives thereof, dienes, acetylenes, styrene, alkenols, alkenoic acids and derivatives thereof, acrylic monomers, and mixtures thereof.

28. The process as recited in claim 27, wherein said olefin is ethylene, propylene hexene, norbornene, or methyl methacrylate.

29. The process as recited in claim 28, wherein said olefin is ethylene.

* * * * *